United States Patent [19]
Koehler

[11] Patent Number: 6,064,983
[45] Date of Patent: May 16, 2000

[54] SYSTEM FOR PERFORMING TAX COMPUTATIONS

[75] Inventor: Scott H. Koehler, Holliston, Mass.

[73] Assignee: Koehler Consulting, Inc., Holliston, Mass.

[21] Appl. No.: 08/822,410

[22] Filed: Mar. 21, 1997

Related U.S. Application Data

[60] Provisional application No. 60/015,355, Apr. 12, 1996, and provisional application No. 60/013,890, Mar. 22, 1996.

[51] Int. Cl.$^7$ .................................................. G06F 17/60
[52] U.S. Cl. ................................................ 705/31; 705/4
[58] Field of Search ...................... 705/31, 4; 395/680, 395/682, 683

[56] References Cited

U.S. PATENT DOCUMENTS

| | | | |
|---|---|---|---|
| 4,949,278 | 8/1990 | Davies et al. .............................. | 705/10 |
| 5,523,942 | 6/1996 | Tyler et al. ................................. | 705/4 |
| 5,546,584 | 8/1996 | Lundlin et al. ......................... | 395/683 |
| 5,687,373 | 11/1997 | Holmes et al. ......................... | 395/682 |

OTHER PUBLICATIONS

Paul Beard, "London Life develops nationwide client–server taxation ES", Intelligent Systems Report, v. 8, n. 7, pp. 9–10, Jul. 1991.

"Insuring the IT Investment", Information Week, p. 64, Jun. 1992.

Koehler, S.H., "Objects in insurance—Gaining the competitive edge in financial services, " *Object Magazine*, comprising 5 pages, (Jul.–Aug. 1992).

Koehler, S.H., "How to handle objects," *Computerworld*, p. 113, (Sep. 20, 1993).

Koehler, S.H., "Bridging a business gap," *Computerworld* (IDG Communications, Inc.), pp. 79 and 83, (Apr. 25, 1994).

Koehler, S.H., "Discovering & Harnessing Busines Objects," *The Object World Insider*, (Jan. 1995).

*Primary Examiner*—Emanuel Todd Voeltz
*Assistant Examiner*—Alexander Kalinowski
*Attorney, Agent, or Firm*—Hamilton, Brook, Smith & Reynolds, P.C.

[57] ABSTRACT

A computer implemented application architecture and software component for providing tax computations for the administration of insurance and annuity products in a reusable software component. A Tax Server is implemented using object-oriented programming techniques and is controlled by a computer processor. The Tax Server has tax regulation classes and product classes that are inter-coupled according to design models so as to model the tax interpretation for various insurance and annuity products.

42 Claims, 30 Drawing Sheets

KCI TAX SUBSYSTEM ARCHITECTURE

Remittance

Premium payment of $290 - Case #1 —106
PUA dump-in of $19,000 - Case #2 —107
Premium $290 in cash rich contract - Case #6 —108

[OK...]  [Cancel]

FIG. 1B

Disbursement

Pua surrender of $3,000 - Case #3
109

[OK...]  [Cancel]

FIG. 1C

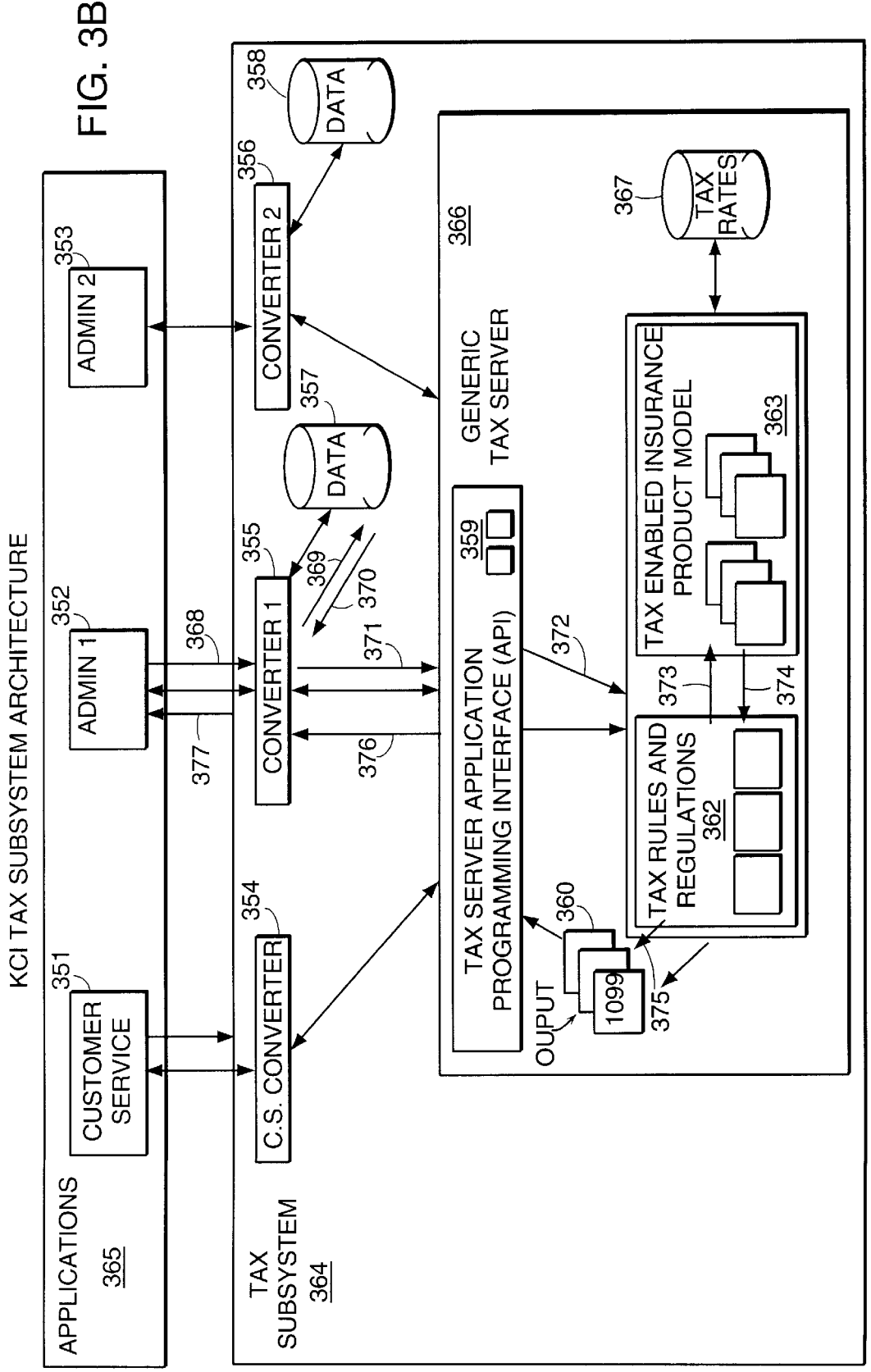

Tax Server Message Layout

| # | Field ID | Format | Size | Starting Offset | Ending Offset |
|---|---|---|---|---|---|
| 1 | BEF-CONTRACT-DATE | Pic 9(8) | 8 | 1 | 8 |
| 2 | BEF-CONTRACT-NUMBER | X(20) | 20 | 9 | 29 |
| 3 | BEF-COST-BASIS | Pic 9(10)V99 | 12 | 30 | |
| 4 | BEF-FEDERAL-WITHHOLDING-YTD | Pic 9(8) | 8 | | |
| 5 | BEF-LAST-ACTIVITY-DATE | Pic 9(8) | 8 | | |
| 6 | BEF-PRE-EVENT-CASH-SURRENDER-VALUE | Pic 9(10)V99 | 12 | | |
| 7 | BEF-PRODUCT-CODE | Pic X(8) | 8 | | |
| 8 | BEF-TAXABLE-GAIN-AMOUNT-YTD | Pic 9(10)V99 | 12 | | |
| 9 | BEF-TAX-REPORTING-YEAR | Pic 9(4) | 4 | | |
| 10 | BEF-LOAN-AMOUNT-TO-DATE | Pic 9(10)V99 | 12 | | |
| 11 | BEF-AMOUNTS-PAID-YEAR-1 | Pic 9(10)V99 | 12 | | |
| 12 | BEF-AMOUNTS-PAID-HIGHEST-YEAR-1 | Pic 9(10)V99 | 12 | | |
| 13 | BEF-AMOUNTS-PAID-YEAR-2 | Pic 9(10)V99 | 12 | | |
| 14 | BEF-AMOUNTS-PAID-HIGHEST-YEAR-2 | Pic 9(10)V99 | 12 | | |
| 15 | BEF-AMOUNTS-PAID-YEAR-3 | Pic 9(10)V99 | 12 | | |
| 16 | BEF-AMOUNTS-PAID-HIGHEST-YEAR-3 | Pic 9(10)V99 | 12 | | |
| 17 | BEF-AMOUNTS-PAID-YEAR-4 | Pic 9(10)V99 | 12 | | |
| 18 | BEF-AMOUNTS-PAID-HIGHEST-YEAR-4 | Pic 9(10)V99 | 12 | | |
| 19 | BEF-AMOUNTS-PAID-YEAR-5 | Pic 9(10)V99 | 12 | | |
| 20 | BEF-AMOUNTS-PAID-HIGHEST-YEAR-5 | Pic 9(10)V99 | 12 | | |
| 21 | BEF-AMOUNTS-PAID-YEAR-6 | Pic 9(10)V99 | 12 | | |
| 22 | BEF-AMOUNTS-PAID-HIGHEST-YEAR-6 | Pic 9(10)V99 | 12 | | |
| 23 | BEF-AMOUNTS-PAID-YEAR-7 | Pic 9(10)V99 | 12 | | |
| 24 | BEF-AMOUNTS-PAID-HIGHEST-YEAR-7 | Pic 9(10)V99 | 12 | | |
| 25 | BEF-DIVIDENDS-PAID-TO-DATE | Pic 9(10)V99 | 12 | | |
| 26 | BEF-HAS-DEATH-BENEFIT-INCREASE | Pic X(1) | 1 | | |
| 27 | BEF-MATERIAL-CHANGE-DATE | Pic 9(8) | 8 | | |
| 28 | BEF-MEC-STATUS | Pic X(1) | 1 | | |
| 29 | BEF-MEC-STATUS-DATE | Pic 9(8) | 8 | | |
| 30 | BEF-SEVEN-PAY-PREMIUM | Pic 9(10)V99 | 12 | | |
| 31 | BEF-TAMRA-LOWDEATH-BENEFIT | Pic 9(10)V99 | 12 | | |
| 32 | BEF-BASEPOLICY-CASH-VALUE | Pic 9(10)V99 | 12 | | |
| 33 | BEF-BASEPOLICY-DISTRIBUTIONS-TO-DATE | Pic 9(10)V99 | 12 | | |
| 34 | BEF-BASEPOLICY-FACE-AMOUNT | Pic 9(10)V99 | 12 | | |
| 35 | BEF-BASEPOLICY-ISSUE-AGE | Pic 9(2) | 2 | | |
| 36 | BEF-BASEPOLICY-ISSUE-SEX | Pic X(1) | 1 | | |
| 37 | BEF-BASEPOLICY-STANDARD-PREMIUMS-PAID-TO-DATE | Pic 9(10)V99 | 12 | | |
| 38 | BEF-BASEPOLICY-RATED-PREMIUMS-PAID-TO-DATE | Pic 9(10)V99 | 12 | | |
| 39 | BEF- BASEPLICY-TAMRA-LOW-DEATH-BENEFIT | Pic 9(10)V99 | 12 | | |
| 40 | BEF-TERM-FACE-AMOUNT | Pic 9(10)V99 | 12 | | |
| 41 | BEF-TERM-STANDARD-PREMIUMS-PAID-TO-DATE | Pic 9(10)V99 | 12 | | |
| 42 | BEF-TERM-RATED-PREMIUMS-PAID-TO-DATE | Pic 9(10)V99 | 12 | | |
| 43 | BEF-TERM-TAMRA-LOW-DEATH-BENEFIT | Pic 9(10)V99 | 12 | | |
| 44 | BEF-ADB-FACE-AMOUNT | Pic 9(10)V99 | 12 | | |
| 45 | BEF-ADB-STANDARD-PREMIUMS-PAID-TO-DATE | Pic 9(10)V99 | 12 | | |
| 46 | BEF-ADB-RATED-PREMIUMS-PAID-TO-DATE | Pic 9(10)V99 | 12 | | |
| 47 | BEF-PUI-CASH-VALUE | Pic 9(10)V99 | 12 | | |
| 48 | BEF-PUI-DISTRIBUTIONS-TO-DATE | Pic 9(10)V99 | 12 | | |
| 49 | BEF-PUI-FACE-AMOUNT | Pic 9(10)V99 | 12 | | |
| 50 | BEF-PUI-STANDARD-PREMIUMS-PAID-TO-DATE | Pic 9(10)V99 | 12 | | |
| 51 | BEF-PUI-RATED-PREMIUMS-PAID-TO-DATE | Pic 9(10)V99 | 12 | | |
| 52 | BEF-PUI-TAMRA-LOW-DEATH-BENEFIT | Pic 9(10)V99 | 12 | | |
| 53 | AFT-CONTRACT-DATE | Pic 9(8) | 8 | | |
| 54 | AFT-CONTRACT-NUMBER | X(20) | 20 | | |
| 55 | AFT-COST-BASIS | Pic 9(10)V99 | 12 | | |
| 56 | AFT-FEDERAL-WITHHOLDING-YTD | Pic 9(8) | 8 | | |
| 57 | AFT-LAST-ACTIVITY-DATE | Pic 9(8) | 8 | | |
| 58 | AFT-PRE-EVENT-CASH-SURRENDER-VALUE | Pic 9(10)V99 | 12 | | |
| 59 | AFT-PRODUCT-CODE | Pic X(8) | 8 | | |
| 60 | AFT-TAXABLE-GAIN-AMOUNT-YTD | Pic 9(10)V99 | 12 | | |

FIG. 13A

KCI Tax Server -- Test cases

| | | | | | |
|---|---|---|---|---|---|
| 61 | AFT-TAX-REPORTING-YEAR | Pic 9(4) | 4 | | |
| 62 | AFT-LOAN-AMOUNT-TO-DATE | Pic 9(10)V99 | 12 | | |
| 63 | AFT-AMOUNTS-PAID-YEAR-1 | Pic 9(10)V99 | 12 | | |
| 64 | AFT-AMOUNTS-PAID-HIGHEST-YEAR-1 | Pic 9(10)V99 | 12 | | |
| 65 | AFT-AMOUNTS-PAID-YEAR-2 | Pic 9(10)V99 | 12 | | |
| 66 | AFT-AMOUNTS-PAID-HIGHEST-YEAR-2 | Pic 9(10)V99 | 12 | | |
| 67 | AFT-AMOUNTS-PAID-YEAR-3 | Pic 9(10)V99 | 12 | | |
| 68 | AFT-AMOUNTS-PAID-HIGHEST-YEAR-3 | Pic 9(10)V99 | 12 | | |
| 69 | AFT-AMOUNTS-PAID-YEAR-4 | Pic 9(10)V99 | 12 | | |
| 70 | AFT-AMOUNTS-PAID-HIGHEST-YEAR-4 | Pic 9(10)V99 | 12 | | |
| 71 | AFT-AMOUNTS-PAID-YEAR-5 | Pic 9(10)V99 | 12 | | |
| 72 | AFT-AMOUNTS-PAID-HIGHEST-YEAR-5 | Pic 9(10)V99 | 12 | | |
| 73 | AFT-AMOUNTS-PAID-YEAR-6 | Pic 9(10)V99 | 12 | | |
| 74 | AFT-AMOUNTS-PAID-HIGHEST-YEAR-6 | Pic 9(10)V99 | 12 | | |
| 75 | AFT-AMOUNTS-PAID-YEAR-7 | Pic 9(10)V99 | 12 | | |
| 76 | AFT-AMOUNTS-PAID-HIGHEST-YEAR-7 | Pic 9(10)V99 | 12 | | |
| 77 | AFT-DIVIDENDS-PAID-TO-DATE | Pic 9(10)V99 | 12 | | |
| 78 | AFT-HAS-DEATH-BENEFIT-INCREASE | Pic X(1) | 1 | | |
| 79 | AFT-MATERIAL-CHANGE-DATE | Pic 9(8) | 8 | | |
| 80 | AFT-MEC-STATUS | Pic X(1) | 1 | | |
| 81 | AFT-MEC-STATUS-DATE | Pic 9(8) | 8 | | |
| 82 | AFT-SEVEN-PAY-PREMIUM | Pic 9(10)V99 | 12 | | |
| 83 | AFT-TAMRA-LOWDEATH-BENEFIT | Pic 9(10)V99 | 12 | | |
| 84 | AFT-BASEPOLICY-CASH-VALUE | Pic 9(10)V99 | 12 | | |
| 85 | AFT-BASEPOLICY-DISTRIBUTIONS-TO-DATE | Pic 9(10)V99 | 12 | | |
| 86 | AFT-BASEPOLICY-FACE-AMOUNT | Pic 9(10)V99 | 12 | | |
| 87 | AFT-BASEPOLICY-ISSUE-AGE | Pic 9(2) | 2 | | |
| 88 | AFT-BASEPOLICY-ISSUE-SEX | Pic X(1) | 1 | | |
| 89 | AFT-BASEPOLICY-STANDARD-PREMIUMS-PAID-TO-DATE | Pic 9(10)V99 | 12 | | |
| 90 | AFT-BASEPOLICY-RATED-PREMIUMS-PAID-TO-DATE | Pic 9(10)V99 | 12 | | |
| 91 | AFT- BASEPLICY-TAMRA-LOW-DEATH-BENEFIT | Pic 9(10)V99 | 12 | | |
| 92 | AFT-TERM-FACE-AMOUNT | Pic 9(10)V99 | 12 | | |
| 93 | AFT-TERM-STANDARD-PREMIUMS-PAID-TO-DATE | Pic 9(10)V99 | 12 | | |
| 94 | AFT-TERM-RATED-PREMIUMS-PAID-TO-DATE | Pic 9(10)V99 | 12 | | |
| 95 | AFT-TERM-TAMRA-LOW-DEATH-BENEFIT | Pic 9(10)V99 | 12 | | |
| 96 | AFT-ADB-FACE-AMOUNT | Pic 9(10)V99 | 12 | | |
| 97 | AFT-ADB-STANDARD-PREMIUMS-PAID-TO-DATE | Pic 9(10)V99 | 12 | | |
| 98 | AFT-ADB-RATED-PREMIUMS-PAID-TO-DATE | Pic 9(10)V99 | 12 | | |
| 99 | AFT-PUI-CASH-VALUE | Pic 9(10)V99 | 12 | | |
| 100 | AFT-PUI-DISTRIBUTIONS-TO-DATE | Pic 9(10)V99 | 12 | | |
| 101 | AFT-PUI-FACE-AMOUNT | Pic 9(10)V99 | 12 | | |
| 102 | AFT-PUI-STANDARD-PREMIUMS-PAID-TO-DATE | Pic 9(10)V99 | 12 | | |
| 103 | AFT-PUI-RATED-PREMIUMS-PAID-TO-DATE | Pic 9(10)V99 | 12 | | |
| 104 | AFT-PUI-TAMRA-LOW-DEATH-BENEFIT | Pic 9(10)V99 | 12 | | |
| 105 | EVENT-EFFECTIVE-DATE | Pic X(8) | 8 | | |
| 106 | EVENT-TYPE | Pic X(1) | 1 | | |

FIG. 13B

KCI Tax Server -- Test cases
Test Cases
Test Case: #1      Premium remittance of $290 -- Standard 7 Pay test
                   Base 150 (100,50), Term 20, PaidUp Insurance 100, ADB 20

| Contract/Component | Field/ Attribute | Before Image (1401) | After Image (1402) | Δ (1403) | Expected Results (1404) |
|---|---|---|---|---|---|
| Contract attributes | contractDate | 2/1/92 | 2/1/92 | | 2/1/92 |
| | contractNumber | CASE1 | CASE1 | | CASE1 |
| | costBasis | 4,000 | 4,000 | | *4,270* |
| | federalWithholdingYTD | 0 | 0 | | 0 |
| | lastActivityDate | 1/10/96 | 1/10/96 | | 1/10/96 |
| | preEventCashSurrenderValue | 5,000 | 5,050 | | 5,050 |
| | productCode | TRAD | TRAD | | TRAD |
| | taxableGainAmountYTD | 0 | 0 | | 0 |
| | taxReportingYear | 1996 | 1996 | | 1996 |
| | loanAmountToDate | 0 | 0 | | 0 |
| Life contract attributes | amountsPaidYear1 | 3087 | 3087 | | 3087 |
| | amountsPaidHighestYear1 | 3087 | 3087 | | 3087 |
| | amountsPaidYear2 | 3187 | 3187 | | 3187 |
| | amountsPaidHighestYear2 | 3187 | 3187 | | 3187 |
| | amountsPaidYear3 | 1,687 | 1,687 | | 1,687 |
| | amountsPaidHighestYear3 | 1,687 | 1,687 | | 1,687 |
| | amountsPaidYear4 | 800 | 800 | | *1,020* |
| | amountsPaidHighestYear4 | 800 | 800 | | *1,020* |
| | amountsPaidYear5 | 0 | 0 | | 0 |
| | amountsPaidHighestYear5 | 0 | 0 | | 0 |
| | amountsPaidYear6 | 0 | 0 | | 0 |
| | amountsPaidHighestYear6 | 0 | 0 | | 0 |
| | amountsPaidYear7 | 0 | 0 | | 0 |
| | amountsPaidHighestYear7 | 0 | 0 | | 0 |
| | dividendsPaidToDate | 1000 | 1000 | | 1000 |
| | hasHadDeathBenefitIncrease | No | No | | No |
| | materialChangeDate | 2/1/92 | 2/1/92 | | 2/1/92 |
| | MECStatus | N | N | | N |
| | MECStatusDate | | | | |
| | sevenPayPremium | 6,930 | 6,930 | | 6,930 |
| | TAMRALowDeathBenefit | 165,000 | 165,000 | | 165,000 |
| BasePolicy | basePolicyCashValue | 1,000 | 1,000 | | 1,000 |
| | basePolicyDistributionsToDate | 0 | 0 | | 0 |
| | basePolicyFaceAmount | 100,000 | 100,000 | | 100,000 |
| | basePolicyIssueAge | 35 | 35 | | 35 |
| | basePolicyIssueSex | M | M | | M |
| | basePolicyStandardPremiumsPaidToDate | 8000 | 8100 | 100 | 8100 |
| | basePolicyRatedPremiumsPaidToDate | 1000 | 1050 | 50 | 1050 |
| | basePolicyTAMRALowDeathBenefit | 100,000 | 100,000 | | 100,000 |
| TermRider | termFaceAmount | 50,000 | 50,000 | | 50,000 |
| | termStandardPremiumsPaidToDate | 200 | 220 | | 220 |
| | termRatedPremiumsPaidToDate | 0 | 0 | | 0 |
| | termTAMRALowDeathBenefit | 50,000 | 50,000 | | 50,000 |
| AccidentalDeathBenefit Rider | adbFaceAmount | 50,000 | 50,000 | | 50,000 |
| | adbStandardPremiumsPaidToDate | 150 | 170 | 20 | 170 |
| | adbRatedPremiumsPaidToDate | 0 | 0 | | 0 |
| PaidUpInsuranceRider | puiCashValue | 1,000 | 1,000 | | 1,000 |
| | puiDistributionsToDate | 50 | 50 | | 50 |
| | puiFaceAmount | 15,000 | 15,500 | 500 | 15,500 |
| | puiStandardPremiumsPaidToDate | 4,100 | 4,200 | 100 | 4,200 |
| | puiRatedPremiumsPaidToDate | 0 | 0 | | 0 |
| | puiTAMRALowDeathBenefit | 15,000 | 15,000 | | 15,000 |

| Event | eventEffectiveDate | 1/10/96 |
|---|---|---|
| | eventType | R |

FIG. 14A

KCI Tax Server -- Test cases
Test Case: #2     Dump-in of $19,000 -- Standard 7 Pay test
                  PaidUp Insurance 19,000

| Contract/Component | Field/ Attribute | Before Image | After Image | Δ | Expected Results |
|---|---|---|---|---|---|
| Contract attributes | contractDate | 2/1/92 | 2/1/92 | | 2/1/92 |
| | contractNumber | CASE2 | CASE2 | | CASE2 |
| | costBasis | 4,000 | 4,000 | | *23,000* |
| | federalWithholdingYTD | 0 | 0 | | 0 |
| | lastActivityDate | 1/10/96 | 1/10/96 | | 1/10/96 |
| | preEventCashSurrenderValue | 5,000 | 5,000 | | 5,000 |
| | productCode | TRAD | TRAD | | TRAD |
| | taxableGainAmountYTD | 0 | 0 | | 0 |
| | taxReportingYear | 1996 | 1996 | | 1996 |
| | loanAmountToDate | 0 | 0 | | 0 |
| Life contract attributes | amountsPaidYear1 | 3087 | 3087 | | 3087 |
| | amountsPaidHighestYear1 | 3087 | 3087 | | 3087 |
| | amountsPaidYear2 | 3187 | 3187 | | 3187 |
| | amountsPaidHighestYear2 | 3187 | 3187 | | 3187 |
| | amountsPaidYear3 | 1,687 | 1,687 | | 1,687 |
| | amountsPaidHighestYear3 | 1,687 | 1,687 | | 1,687 |
| | amountsPaidYear4 | 800 | 800 | | *19,800* |
| | amountsPaidHighestYear4 | 800 | 800 | | *19,800* |
| | amountsPaidYear5 | 0 | 0 | | 0 |
| | amountsPaidHighestYear5 | 0 | 0 | | 0 |
| | amountsPaidYear6 | 0 | 0 | | 0 |
| | amountsPaidHighestYear6 | 0 | 0 | | 0 |
| | amountsPaidYear7 | 0 | 0 | | 0 |
| | amountsPaidHighestYear7 | 0 | 0 | | 0 |
| | dividendsPaidToDate | 1,000 | 1,000 | | 1,000 |
| | hasHadDeathBenefitIncrease | No | No | | *Yes* |
| | materialChangeDate | 2/1/92 | 2/1/92 | | 2/1/92 |
| | MECStatus | N | N | | *R* |
| | MECStatusDate | | | | *1/10/96* |
| | sevenPayPremium | 6,930 | 6,930 | | 6,930 |
| | TAMRALowDeathBenefit | 165,000 | 165,000 | | 165,000 |
| BasePolicy | basePolicyCashValue | 1,000 | 1,000 | | 1,000 |
| | basePolicyDistributionsToDate | 0 | 0 | | 0 |
| | basePolicyFaceAmount | 100,000 | 100,000 | | 100,000 |
| | basePolicyIssueAge | 35 | 35 | | 35 |
| | basePolicyIssueSex | M | M | | M |
| | basePolicyStandardPremiumsPaidToDate | 8000 | 8000 | | 8000 |
| | basePolicyRatedPremiumsPaidToDate | 1000 | 1000 | | 1000 |
| | basePolicyTAMRALowDeathBenefit | 100,000 | 100,000 | | 100,000 |
| TermRider | termFaceAmount | 50,000 | 50,000 | | 50,000 |
| | termStandardPremiumsPaidToDate | 200 | 200 | | 200 |
| | termRatedPremiumsPaidToDate | 0 | 0 | | 0 |
| | termTAMRALowDeathBenefit | 50,000 | 50,000 | | 50,000 |
| AccidentalDeathBenefit Rider | adbFaceAmount | 50,000 | 50,000 | | 50,000 |
| | adbStandardPremiumsPaidToDate | 150 | 150 | | 150 |
| | adbRatedPremiumsPaidToDate | 0 | 0 | | 0 |
| PaidUpInsuranceRider | puiCashValue | 1,000 | 1,000 | | 1,000 |
| | puiDistributionsToDate | 50 | 50 | | 50 |
| | puiFaceAmount | 15,000 | 65,000 | 50,000 | 65,000 |
| | puiStandardPremiumsPaidToDate | 4,100 | 23,100 | 19,000 | 23,100 |
| | puiRatedPremiumsPaidToDate | 0 | 0 | | 0 |
| | puiTAMRALowDeathBenefit | 15,000 | 15,000 | | 15,000 |

| Event | eventEffectiveDate | 1/10/96 |
|---|---|---|
| | eventType | R |

FIG. 14B

KCI Tax Server -- Test cases
Test Cases
Test Case: #3          PaidUp Insurance partial surrender of $ 3,000 (reduction test)

| Contract/Component | Field/ Attribute | Before Image | After Image | Δ | Expected Results |
|---|---|---|---|---|---|
| Contract attributes | contractDate | 2/1/92 | 2/1/92 | | 2/1/92 |
| | contractNumber | CASE3 | CASE3 | | CASE3 |
| | costBasis | 4,000 | 4,000 | | *2,000* |
| | federalWithholdingYTD | 0 | 0 | | *100* |
| | lastActivityDate | 1/10/96 | 1/10/96 | | 1/10/96 |
| | preEventCashSurrenderValue | 5,000 | 5,000 | | 5,000 |
| | productCode | TRAD | TRAD | | TRAD |
| | taxableGainAmountYTD | 0 | 0 | | *1,000* |
| | taxReportingYear | 1996 | 1996 | | 1996 |
| | loanAmountToDate | 0 | 0 | | 0 |
| Life contract attributes | amountsPaidYear1 | 3087 | 3087 | | 3087 |
| | amountsPaidHighestYear1 | 3087 | 3087 | | 3087 |
| | amountsPaidYear2 | 10,087 | 10,087 | | 10,087 |
| | amountsPaidHighestYear2 | 10,087 | 10,087 | | 10,087 |
| | amountsPaidYear3 | 1,687 | 1,687 | | 1,687 |
| | amountsPaidHighestYear3 | 1,687 | 1,687 | | 1,687 |
| | amountsPaidYear4 | 800 | 800 | | *-2,200* |
| | amountsPaidHighestYear4 | 800 | 800 | | 800 |
| | amountsPaidYear5 | 0 | 0 | | 0 |
| | amountsPaidHighestYear5 | 0 | 0 | | 0 |
| | amountsPaidYear6 | 0 | 0 | | 0 |
| | amountsPaidHighestYear6 | 0 | 0 | | 0 |
| | amountsPaidYear7 | 0 | 0 | | 0 |
| | amountsPaidHighestYear7 | 0 | 0 | | 0 |
| | dividendsPaidToDate | 1000 | 1000 | | 1000 |
| | hasHadDeathBenefitIncrease | No | No | | No |
| | materialChangeDate | 2/1/92 | 2/1/92 | | 2/1/92 |
| | MECStatus | N | N | | *I* |
| | MECStatusDate | | | | *1/10/96* |
| | sevenPayPremium | 6,930 | 6,930 | | *6552* |
| | TAMRALowDeathBenefit | 165,000 | 165,000 | | *156,000* |
| BasePolicy | basePolicyCashValue | 1,000 | 1,000 | | 1,000 |
| | basePolicyDistributionsToDate | 0 | 0 | | 0 |
| | basePolicyFaceAmount | 100,000 | 100,000 | | 100,000 |
| | basePolicyIssueAge | 35 | 35 | | 35 |
| | basePolicyIssueSex | M | M | | M |
| | basePolicyStandardPremiumsPaidToDate | 8000 | 8000 | | 8000 |
| | basePolicyRatedPremiumsPaidToDate | 1000 | 1000 | | 1000 |
| | basePolicyTAMRALowDeathBenefit | 100,000 | 100,000 | | 100,000 |
| TermRider | termFaceAmount | 25,000 | 25,000 | | 25,000 |
| | termStandardPremiumsPaidToDate | 200 | 200 | | 200 |
| | termRatedPremiumsPaidToDate | 0 | 0 | | 0 |
| | termTAMRALowDeathBenefit | 25,000 | 25,000 | | 25,000 |
| AccidentalDeathBenefit Rider | adbFaceAmount | 50,000 | 50,000 | | 50,000 |
| | adbStandardPremiumsPaidToDate | 150 | 150 | | 150 |
| | adbRatedPremiumsPaidToDate | 0 | 0 | | 0 |
| PaidUpInsuranceRider | puiCashValue | 1,000 | 1,000 | | 1,000 |
| | puiDistributionsToDate | 50 | 3,050 | 3,000 | 3,050 |
| | puiFaceAmount | 45,000 | 31,000 | -14,000 | 31,000 |
| | puiStandardPremiumsPaidToDate | 14,100 | 14,100 | | 14,100 |
| | puiRatedPremiumsPaidToDate | 0 | 0 | | 0 |
| | puiTAMRALowDeathBenefit | 40,000 | 40,000 | | 31,000 |

| Event | eventEffectiveDate | 1/10/96 |
|---|---|---|
| | eventType | D |

FIG. 14C

KCI Tax Server -- Test cases
Test Case: #4          Policy Change Term Rider Add $200 premium -- material change test

| Contract/Component | Field/ Attribute | Before Image | After Image | Δ | Expected Results |
|---|---|---|---|---|---|
| Contract attributes | contractDate | 2/1/92 | 2/1/92 | | 2/1/92 |
| | contractNumber | CASE4 | CASE4 | | CASE4 |
| | costBasis | 4,000 | 4,000 | | *4,200* |
| | federalWithholdingYTD | 0 | 0 | | 0 |
| | lastActivityDate | 1/10/96 | 1/10/96 | | 1/10/96 |
| | preEventCashSurrenderValue | 5,000 | 5,000 | | 5,000 |
| | productCode | TRAD | TRAD | | TRAD |
| | taxableGainAmountYTD | 0 | 0 | | 0 |
| | taxReportingYear | 1996 | 1996 | | 1996 |
| | loanAmountToDate | 0 | 0 | | 0 |
| Life contract attributes | amountsPaidYear1 | 3087 | 3087 | | *200* |
| | amountsPaidHighestYear1 | 3087 | 3087 | | *200* |
| | amountsPaidYear2 | 3187 | 3187 | | *0* |
| | amountsPaidHighestYear2 | 3187 | 3187 | | *0* |
| | amountsPaidYear3 | 1087 | 1087 | | *0* |
| | amountsPaidHighestYear3 | 1087 | 1087 | | *0* |
| | amountsPaidYear4 | 800 | 800 | | *0* |
| | amountsPaidHighestYear4 | 800 | 800 | | *0* |
| | amountsPaidYear5 | 0 | 0 | | 0 |
| | amountsPaidHighestYear5 | 0 | 0 | | 0 |
| | amountsPaidYear6 | 0 | 0 | | 0 |
| | amountsPaidHighestYear6 | 0 | 0 | | 0 |
| | amountsPaidYear7 | 0 | 0 | | 0 |
| | amountsPaidHighestYear7 | 0 | 0 | | 0 |
| | dividendsPaidToDate | 1000 | 1000 | | 1000 |
| | hasHadDeathBenefitIncrease | No | No | | No |
| | materialChangeDate | 2/1/92 | 2/1/92 | | 2/1/92 |
| | MECStatus | N | N | | N |
| | MECStatusDate | | | | |
| | sevenPayPremium | 4,830 | 4,830 | | *7,093.87* |
| | TAMRALowDeathBenefit | 115,000 | 115,000 | | *165,000* |
| BasePolicy | basePolicyCashValue | 1,000 | 1,000 | | 1,000 |
| | basePolicyDistributionsToDate | 0 | 0 | | 0 |
| | basePolicyFaceAmount | 100,000 | 100,000 | | 100,000 |
| | basePolicyIssueAge | 35 | 35 | | 35 |
| | basePolicyIssueSex | M | M | | M |
| | basePolicyStandardPremiumsPaidToDate | 8000 | 8000 | | 8000 |
| | basePolicyRatedPremiumsPaidToDate | 1000 | 1000 | | 1000 |
| | basePolicyTAMRALowDeathBenefit | 100,000 | 100,000 | | 100,000 |
| TermRider | termFaceAmount | 0 | 49,500 | 49,500 | 49,500 |
| | termStandardPremiumsPaidToDate | 0 | 200 | 200 | 200 |
| | termRatedPremiumsPaidToDate | 0 | 0 | | 0 |
| | termTAMRALowDeathBenefit | 0 | 0 | | *49,500* |
| AccidentalDeathBenefit Rider | adbFaceAmount | 50,000 | 50,000 | | 50,000 |
| | adbStandardPremiumsPaidToDate | 150 | 150 | | 150 |
| | adbRatedPremiumsPaidToDate | 0 | 0 | | 0 |
| PaidUpInsuranceRider | puiCashValue | 1,000 | 1,000 | | 1,000 |
| | puiDistributionsToDate | 50 | 50 | | 50 |
| | puiFaceAmount | 15,500 | 15,500 | | 15,500 |
| | puiStandardPremiumsPaidToDate | 4,200 | 4,200 | | 4,200 |
| | puiRatedPremiumsPaidToDate | 0 | 0 | | 0 |
| | puiTAMRALowDeathBenefit | 15,000 | 15,000 | | *15,500* |

| Event | eventEffectiveDate | 1/10/96 |
|---|---|---|
| | eventType | C |

FIG. 14D

KCI Tax Server -- Test cases
Test Case: #5             Dividend of $400 -- Dividends in Excess of Cost Basis

| Contract/Component | Field/ Attribute | Before Image | After Image | Δ | Expected Results |
|---|---|---|---|---|---|
| Contract attributes | contractDate | 2/1/72 | 2/1/72 | | 2/1/72 |
| | contractNumber | CASE5 | CASE5 | | CASE5 |
| | costBasis | 100 | 100 | | *0* |
| | federalWithholdingYTD | 0 | 0 | | *30* |
| | lastActivityDate | 1/10/96 | 1/10/96 | | 1/10/96 |
| | preEventCashSurrenderValue | 5,000 | 5,000 | | 5,000 |
| | productCode | TRAD | TRAD | | TRAD |
| | taxableGainAmountYTD | 0 | 0 | | *300* |
| | taxReportingYear | 1996 | 1996 | | 1996 |
| | loanAmountToDate | 0 | 0 | | 0 |
| Life contract attributes | amountsPaidYear1 | 3087 | 3087 | | 3087 |
| | amountsPaidHighestYear1 | 3087 | 3087 | | 3087 |
| | amountsPaidYear2 | 3187 | 3187 | | 3187 |
| | amountsPaidHighestYear2 | 3187 | 3187 | | 3187 |
| | amountsPaidYear3 | 1,687 | 1,687 | | 1,687 |
| | amountsPaidHighestYear3 | 1,687 | 1,687 | | 1,687 |
| | amountsPaidYear4 | 800 | 800 | | 800 |
| | amountsPaidHighestYear4 | 800 | 800 | | 800 |
| | amountsPaidYear5 | 0 | 0 | | 0 |
| | amountsPaidHighestYear5 | 0 | 0 | | 0 |
| | amountsPaidYear6 | 0 | 0 | | 0 |
| | amountsPaidHighestYear6 | 0 | 0 | | 0 |
| | amountsPaidYear7 | 0 | 0 | | 0 |
| | amountsPaidHighestYear7 | 0 | 0 | | 0 |
| | dividendsPaidToDate | 10,000 | 10,400 | 400 | 10,400 |
| | hasHadDeathBenefitIncrease | No | No | | No |
| | materialChangeDate | 2/1/92 | 2/1/92 | | 2/1/92 |
| | MECStatus | N | N | | N |
| | MECStatusDate | | | | |
| | sevenPayPremium | 6,930 | 6,930 | | 6,930 |
| | TAMRALowDeathBenefit | 165,000 | 165,000 | | 165,000 |
| BasePolicy | basePolicyCashValue | 1,000 | 1,000 | | 1,000 |
| | basePolicyDistributionsToDate | 0 | 0 | | 0 |
| | basePolicyFaceAmount | 100,000 | 100,000 | | 100,000 |
| | basePolicyIssueAge | 35 | 35 | | 35 |
| | basePolicyIssueSex | M | M | | M |
| | basePolicyStandardPremiumsPaidToDate | 8000 | 8000 | | 8000 |
| | basePolicyRatedPremiumsPaidToDate | 1000 | 1000 | | 1000 |
| | basePolicyTAMRALowDeathBenefit | 100,000 | 100,000 | | 100,000 |
| TermRider | termFaceAmount | 50,000 | 50,000 | | 50,000 |
| | termStandardPremiumsPaidToDate | 200 | 200 | | 200 |
| | termRatedPremiumsPaidToDate | 0 | 0 | | 0 |
| | termTAMRALowDeathBenefit | 50,000 | 50,000 | | 50,000 |
| AccidentalDeathBenefit Rider | adbFaceAmount | 50,000 | 50,000 | | 50,000 |
| | adbStandardPremiumsPaidToDate | 150 | 150 | | 150 |
| | adbRatedPremiumsPaidToDate | 0 | 0 | | 0 |
| PaidUpInsuranceRider | puiCashValue | 1,000 | 1,000 | | 1,000 |
| | puiDistributionsToDate | 50 | 50 | | 50 |
| | puiFaceAmount | 15,000 | 15,000 | | 15,000 |
| | puiStandardPremiumsPaidToDate | 4,100 | 4,100 | | 4,100 |
| | puiRatedPremiumsPaidToDate | 0 | 0 | | 0 |
| | puiTAMRALowDeathBenefit | 15,000 | 15,000 | | 15,000 |

| Event | eventEffectiveDate | 1/10/96 |
|---|---|---|
| | eventType | R |

FIG. 14E

KCI Tax Server -- Test cases
Test Case: #6  Remittance of $290 -- Necessary premium test

| Contract/Component | Field/ Attribute | Before Image | After Image | Δ | Expected Results |
|---|---|---|---|---|---|
| Contract attributes | contractDate | 2/1/92 | 2/1/92 | | 2/1/92 |
| | contractNumber | CASE6 | CASE6 | | CASE6 |
| | costBasis | 4,000 | 4,000 | | *4,270* |
| | federalWithholdingYTD | 0 | 0 | | 0 |
| | lastActivityDate | 1/10/96 | 1/10/96 | | 1/10/96 |
| | preEventCashSurrenderValue | 52,400 | 52,600 | 200 | 52,600 |
| | productCode | TRAD | TRAD | | TRAD |
| | taxableGainAmountYTD | 0 | 0 | | 0 |
| | taxReportingYear | 1996 | 1996 | | 1996 |
| | loanAmountToDate | 0 | 0 | | *0* |
| Life contract attributes | amountsPaidYear1 | 3087 | 3087 | | *220* |
| | amountsPaidHighestYear1 | 3087 | 3087 | | *220* |
| | amountsPaidYear2 | 3187 | 3187 | | *0* |
| | amountsPaidHighestYear2 | 3187 | 3187 | | *0* |
| | amountsPaidYear3 | 1,687 | 1,687 | | *0* |
| | amountsPaidHighestYear3 | 1,687 | 1,687 | | *0* |
| | amountsPaidYear4 | 800 | 800 | | *0* |
| | amountsPaidHighestYear4 | 800 | 800 | | *0* |
| | amountsPaidYear5 | 0 | 0 | | 0 |
| | amountsPaidHighestYear5 | 0 | 0 | | 0 |
| | amountsPaidYear6 | 0 | 0 | | 0 |
| | amountsPaidHighestYear6 | 0 | 0 | | 0 |
| | amountsPaidYear7 | 0 | 0 | | 0 |
| | amountsPaidHighestYear7 | 0 | 0 | | 0 |
| | dividendsPaidToDate | 1000 | 1000 | | 1000 |
| | hasHadDeathBenefitIncrease | No | Yes | | *No* |
| | materialChangeDate | 2/1/92 | 2/1/92 | | *1/10/96* |
| | MECStatus | N | N | | N |
| | MECStatusDate | | | | |
| | sevenPayPremium | 6,930 | 6,930 | | *7,116.37* |
| | TAMRALowDeathBenefit | 165,000 | 165,000 | | *165,500* |
| BasePolicy | basePolicyCashValue | 1,000 | 1,000 | | 1,000 |
| | basePolicyDistributionsToDate | 0 | 0 | | 0 |
| | basePolicyFaceAmount | 100,000 | 100,000 | | 100,000 |
| | basePolicyIssueAge | 35 | 35 | | 35 |
| | basePolicyIssueSex | M | M | | M |
| | basePolicyStandardPremiumsPaidToDate | 8000 | 8100 | 100 | 8100 |
| | basePolicyRatedPremiumsPaidToDate | 1000 | 1050 | 50 | 1050 |
| | basePolicyTAMRALowDeathBenefit | 100,000 | 100,000 | | 100,000 |
| TermRider | termFaceAmount | 50,000 | 50,000 | | 50,000 |
| | termStandardPremiumsPaidToDate | 200 | 220 | 20 | 220 |
| | termRatedPremiumsPaidToDate | 0 | 0 | | 0 |
| | termTAMRALowDeathBenefit | 50,000 | 50,000 | | 50,000 |
| AccidentalDeathBenefit Rider | adbFaceAmount | 50,000 | 50,000 | | 50,000 |
| | adbStandardPremiumsPaidToDate | 150 | 170 | 20 | 170 |
| | adbRatedPremiumsPaidToDate | 0 | 0 | | 0 |
| PaidUpInsuranceRider | puiCashValue | 1,000 | 1,000 | | 1,000 |
| | puiDistributionsToDate | 50 | 50 | | 50 |
| | puiFaceAmount | 15,000 | 15,500 | 500 | 15,500 |
| | puiStandardPremiumsPaidToDate | 4,100 | 4,200 | 100 | 4,200 |
| | puiRatedPremiumsPaidToDate | 0 | 0 | | 0 |
| | puiTAMRALowDeathBenefit | 15,000 | 15,000 | | 15,000 |

| Event | eventEffectiveDate | 1/10/96 |
|---|---|---|
| | eventType | R |

FIG. 14F

CASE 3 OUTPUT

1501 {
--Created an object of (KciContractData)
--Created an object of (KciContractData)
--Created an object of (KciEventData)
--Created an object of (KciFolder)
--Created an object of (KciTraditionalLifeInsuranceFactory)
--Created an object of (KciTraditionalLifeInsuranceFactory)
--Created an object of (KciObjectCoupler)
--Created an object of (KciMECStatus)
--Created an object of (KciTraditionalLifeInsuranceContract)
--Created an object of (KciObjectCoupler)
--Created an object of (KciBasePolicy)
--Created an object of (KciObjectCoupler)
--Created an object of (KciAccientalDeathBenefitRider)
--Created an object of (KciObjectCoupler)
--Created an object of (KciTermRider)
--Created an object of (KciObjectCoupler)
--Created an object of (KciPaidUpInsuranceRider)
--Created an object of (KciInsured)
--Created an object of (KciParticipant)
--Created an object of (KciObjectCoupler)
--Created an object of (KciMECStatus)
--Created an object of (KciTraditionalLifeInsuranceContract)
--Created an object of (KciObjectCoupler)
--Created an object of (KciBasePolicy)
--Created an object of (KciObjectCoupler)
--Created an object of (KciAccientalDeathBenefitRider)
--Created an object of (KciObjectCoupler)
--Created an object of (KciTermRider)
--Created an object of (KciObjectCoupler)
--Created an object of (KciPaidUpInsuranceRider)
--Created an object of (KciInsured)
--Created an object of (KciParticipant)
--Created an object of (KciDisbursementEvent)
--Created an object of (KciFederalWitholdingRequirement)
--Created an object of (KciLifeInsuranceTaxAdvisor)
--Created an object of (KciTAMRALegislation)
--Created an object of (KciTAMRAGrandFatherTest)
--Created an object of (KciMaterialChangeTest)
--Created an object of (KciSevenPayTest)
--Created an object of (KciBenefitReductionTest)
--Created an object of (KciNeccessaryPremiumTest)
--Created an object of (KciMECTest)
--Created an object of (KciTestDate)

--Testing contract: CASE3 (KciTaxServer) — 1502
--Testing contract (KciLifeInsuranceTaxAdvisor)
--Testing contract (KciTAMRALegislation) — 1503
1513 --Performing necessary premium test (KciNeccessaryPremiumTest)
1514 --Performing TAMRA grandfather test (KciTAMRAGrandFatherTest)
1512 --Contract is not grandfathered. (KciTAMRAGrandFather Test)

1504 {
--Amount paid affect of $0.0 for (KciBasePolicy)
--Amount paid affect of $0.0 for (KciAccidentalDeathBenefitRider)
--Amount paid affect of $0.0 for (KciTermRider)
--Amount paid affect of $-3000.0 for (KciPaidUpInsuranceRider)

--Adjusting amounts paid for year4 by -3000.0 (KciTAMRALegislation)
1509 --Performing MEC Test (KciMECTest)
1510 --Performing MEC reduction test (KciBenefitReductionTest)
1511 --Has reduction in benefits (KciBenefitReductionTest)
--Created an object of (KciReductionTestFailureInformation)
--Reduction test fails in year 2 by 178.0 (KciBenefitReductionTest)
--Adjusting TAMRA Low Death Benefit to 156000.0
  (KciTraditionalLifeInsurance)
--Adjusting seven pay premium to 6498.0 (KciTraditionalLife
  InsuranceContract)
--Created an object of (KciMECAcknowledgementLetter)
--Created an object of (KciTAMRAInformation)
--Distribution subject to taxation of 3000.0 (KciLifeInsuranceTaxAdvisor)
--Created an object of (KciForm1099R)
--Created an object of (KciTaxableGainProcess)
--Performing taxable gain process (KciTaxableGainProcess)
1515 --Taxable amount of 1000.0 (KciTaxableGainProcess)
--1099 should be filed(KciLifeInsuranceTaxAdvisor)
1505 --Basis affect of $0.0 for (KciBasePolicy)

FIG. 15A

CASE 3 OUTPUT

1506 --Basis affect of $0.0 for (KciAccidentalDeathBenefitRider)
1507 --Basis affect of $0.0 (KciTermRider)
1508 --Basis affect of $-3000.0 for (KciPaidUpInsuranceRider)
   --Cost basis adjusted from 4000.0 to: 2000.0 (KciLifeInsuranceTaxAdvisor)
   --*Outputs of Contract Testing*(KciTaxServer)

FIG. 15B

Case 3 Output

1516 -- KciContractData {

| | |
|---|---|
| adbFaceAmount | 50000.0 |
| adbRatedPremiumsPaidToDate | 0.0 |
| adbStandardPremiumsPaidToDate | 150.0 |
| amountsPaidHighestYear1 | 3087.0 |
| amountsPaidHighestYear2 | 10087.0 |
| amountsPaidHighestYear3 | 1687.0 |
| amountsPaidHighestYear4 | 800.0 |
| amountsPaidHighestYear5 | 0.0 |
| amountsPaidHighestYear6 | 0.0 |
| amountsPaidHighestYear7 | 0.0 |
| amountsPaidYear1 | 3087.0 |
| amountsPaidYear2 | 10087.0 |
| amountsPaidYear3 | 1687.0 |
| amountsPaidYear4 | -2200.0 |
| amountsPaidYear5 | 0.0 |
| amountsPaidYear6 | 0.0 |
| amountsPaidYear7 | 0.0 |
| basePolicyCashValue | 1000.0 |
| basePolicyDistributionsToDate | 0.0 |
| basePolicyFaceAmount | 100000.0 |
| basePolicyIssueAge | 35.0 |
| basePolicyIssueSex | M |
| basePolicyRatedPremiumsPaidToDate | 1000.0 |
| basePolicyStandardPremiumsPaidToDate | 8000.0 |
| basePolicyTAMRALowDeathBenefit | 100000.0 |
| contractDate | 2/1/92 |
| contractNumber | CASE3 |
| costBasis | 2000.0 |
| dividendsPaidToDate | 1000.0 |
| federalWithholdingYTD | 100.0 |
| hasHadDeathBenefitIncrease | false |
| imageType | after |
| lastActivityDate | 1/10/96 |
| materialChangeDate | 2/1/92 |
| MECStatus | I |
| MECStatusDate | 1/10/96 |
| preEventCashSurrenderValue | 5000.0 |
| productCode | TRAD |
| puiCashValue | 1000.0 |
| puiDistributionsToDate | 3050.0 |
| puiFaceAmount | 31000.0 |
| puiRatedPremiumsPaidToDate | 0.0 |
| puiStandardPremiumsPaidToDate | 14100.0 |
| puiTAMRALowDeathBenefit | 31000.0 |
| sevenPayPremium | 6498.0 |
| TAMRALowDeathBenefit | 156000.0 |
| taxableGainAmountYTD | 1000.0 |
| taxReportingYear | 1996.0 |
| termFaceAmount | 25000.0 |
| termRatedPremiumsPaidToDate | 0.0 |
| termStandardPremiumsPaidToDate | 200.0 |
| termTAMRALowDeathBenefit | 25000.0 |

SYSTEM FOR PERFORMING TAX COMPUTATIONS

RELATED APPLICATIONS

This application claims priority to U.S. Provisional Application Ser. No. 60/015,355, filed Apr. 12, 1996, and U.S. Provisional Application Ser. No. 60/013,890, filed Mar. 22, 1996, the contents of which are incorporated herein by reference in its entirety.

BACKGROUND OF THE INVENTION

Life insurance policies and annuities are financial products that are purchased by individuals. Along with providing insurance protection, these products contain internal cash value which grows over time, much like a bank savings account. In general, this internal build up of value is tax-deferred, however, it may be subject to taxation upon certain contractual events. The Internal Revenue Code (IRC), which governs insurance and annuities, is quite complicated, and has been modified frequently over the last tell years.

Noteworthy sections of the Internal Revenue Code include sections 72(e), 7702, and 7702A. The latter is the most recent legislation, also called "The Technical and Miscellaneous Revenue Act (TAMRA) of 1986." It introduced testing rules that determine whether an insurance contract is being used as an investment rather than as insurance. Insurance company's were given seven years to comply with this legislation in their administration of insurance policies.

Many companies have been unable to achieve automated (non-manual) compliance with these laws. For many insurance companies, updating their current legacy (existing) administrative computer systems is a daunting task, because they are over twenty years old and are not constructed in a manner suitable to performing the complicated testing requirements. In addition, many companies have multiple administration systems requiring substantially the same tax processing.

There have been two primary conventional computer system approaches to this problem. The first conventional method is to update the current systems with tax related logic. This is usually done "inside" the current system and may be accomplished by using separate computer software subroutines. This is the response selected by many vendors of insurance administrative system software. This method generally has the computer programs call specific tax related logic at various points during the processing while supplying only the information required by the particular tax routine.

The second conventional method is to assemble tax related logic in a separate computer subsystem. Portions of this logic are specifically invoked when certain tax processing is desired. Generally, this approach relies on the primary system to "know" when to invoke certain tax processing based on the transaction being processed. This results in the separate tax system being "told" what tax processing to perform.

This approach often includes a "tax database," where tax related information is stored. This data is normally "contractual" data (in that it varies by a particular insurance contract) that the current system just is not storing.

SUMMARY OF THE INVENTION

Invariably, implementations of tax logic treat sections of the Internal Revenue Code in a "stove pipe" fashion, where they are implemented independently of each other. For example, different computer modules might exist for computing taxable gain and performing each "test" mandated by the TAMRA legislation (where there are many).

Unfortunately, in reality, the tax code is extremely integrated. For example, before one can perform a taxable gain calculation, TAMRA related tests must be performed to determine if the insurance contract's taxation method is taxed as cost recovery first (sometimes called "FIFO" or return of investment first) or gain first (sometimes called "LIFO"). (The latter generally results in a taxable amount being reported to the policyholder on a 1099 form, which requires payment of federal income tax in the current year.)

Several drawbacks exist to prior art methods:
1. Prior art methods place "tax knowledge" in inappropriate areas of the computer software, making the implementation more rigid, which results in poor maintainability.
2. Making changes inside legacy applications is very expensive, as these systems are often very large, quite brittle, and generally poorly documented.
3. The implementation of prior art methods is invariably complicated by many rules related to the products offered by the company. These are generally in the form of "THEN ELSE" rules. For example, if the premium paid is for the "Accidental Death Benefit rider" then do not include it in the contract's cost basis.
4. The tax solutions are not reusable with other systems. The same basic logic needs to be replicated many times.
5. Storing data in a tax database separate from the primary storage of the contractual information increases implementation complexity due to the requirement to ensure the integrity and consistency of the data. Additionally, because it contains data not currently stored in the primary system, its contents are highly coupled to the existing system, and are thus far less reusable. That is, the data missing in one primary system is different from the data missing from another.
6. Prior art methods make it difficult (or impossible) to truly provide the integrated testing required by the tax law.

A preferred embodiment of the invention is a strategic tax subsystem application architecture for achieving automated tax compliance consisting of several computer software components where one component is an object oriented tax component.

Preferably, a system provides a computer-based solution which:
1. Provides a single software source of federal and state tax interpretation for insurance and annuity products in a separate software component, which is implemented outside of existing software systems
2. Provides a separate Tax Server that presents a generic interface usable by multiple systems, including:
   administrative systems
   new issue systems
   customer support systems
   illustration systems
3. Includes a separate Tax Server that contains no knowledge of the systems with which it interoperates
4. Contains tax processing that is not triggered by the actual business event being processed. It alone determines which tax processing is required by evaluating the changes in an insurance contract as a result of applying a particular business event
5. Provides the ability to provide service in multiple modes (batch or on-line) or multiple times during a transaction
6. Is constructed with a flexible object oriented design and implementation to allow for easy introduction of new products or new tax regulations or revised interpretations where the design effectively manages the inherent complexity in this area.

A preferred system adheres to many design principles, which make it preferred to conventional approaches. Some of the design principles include:

(1) Limit knowledge of existing systems by limiting access to the Tax Server through a generic message;
(2) Separate generic rules from product related tax interpretations;
(3) Evaluate tax impacts by operating on state changes of the insurance contract;
(4) Do not maintain contractual data in the separate Tax Server component;
(5) Design the Tax Server to only run forward. Historical data is developed by another method; and
(6) Respond to any and all requests for tax testing, which enables multiple requests to be initiated by the client application in the processing of a single administrative transaction.

The above and other features of the invention, including various novel details of construction and combination of parts, will now be more particularly described with reference to the accompanying drawings and pointed out in the claims. It will be understood that the particular system for performing the computations embodying the invention is shown by way of illustration only and not as a limitation of the invention. The principles and features of this invention may be embodied in varied and numerous embodiments without departing from the scope of the invention.

BRIEF DESCRIPTION OF THE DRAWINGS

FIGS. 1A–1H illustrate a preferred user interface of a Tax Server in accordance with the invention.

FIG. 3B is a diagram which depicts a strategic tax subsystem architecture.

FIGS. 13A–13B are examples of a Tax Server Message Layout.

FIGS. 14A–14F are test cases used to demonstrate the functionality of a preferred Tax Server.

FIGS. 15A–15C are representative Tax Server output from processing one of the test cases.

DETAILED DESCRIPTION OF PREFERRED EMBODIMENTS OF THE INVENTION

FIGS. 1A–1H illustrate a preferred user interface of a Tax Server in accordance with the invention. Under normal operation, the Tax Server is preferably hooked up to another system, so it does not usually have a user interface. This interface can be used to demonstrate the Tax Server in its standalone mode.

The demonstration provides test cases that simulate significant transactions processed by most life insurance administrative systems. They include:

Remittance (101). This selects from business events (transactions) where money comes into the contract from the policyholder. FIG. 1B shows the three test cases available with the demonstration in this category (106, 107, and 108).

Disbursement (102). This selects from business events where money is withdrawn from an insurance contract. FIG. 1C shows the one test case available with the demonstration in this category (109).

Figure 1A:
Figure 1D:
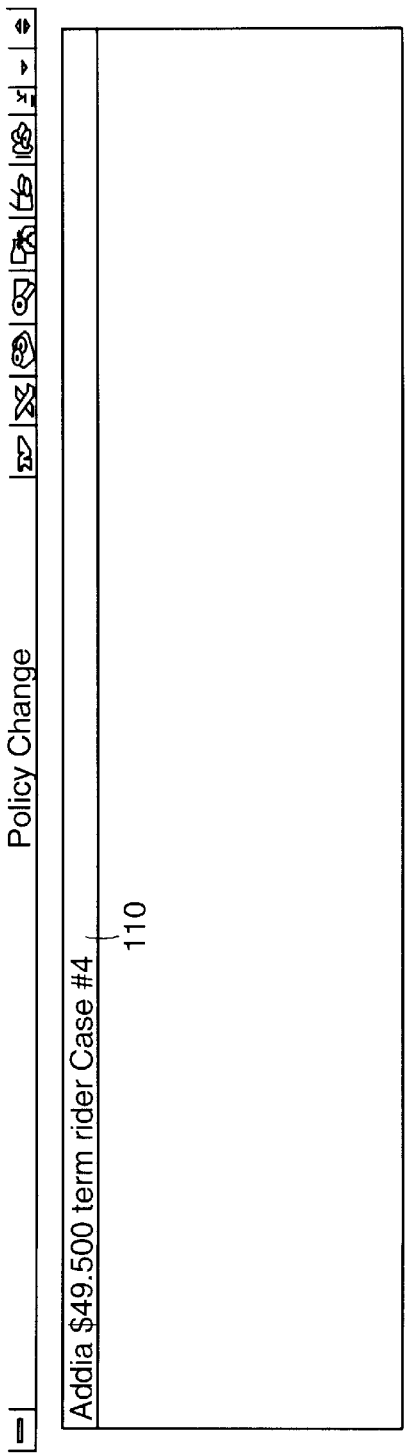

Policy Change (103). This selects from business events where the policyholder's contract is changed in some way. FIG. 1D shows the one test case available with the demonstration in this category (110).

Figure 1E:
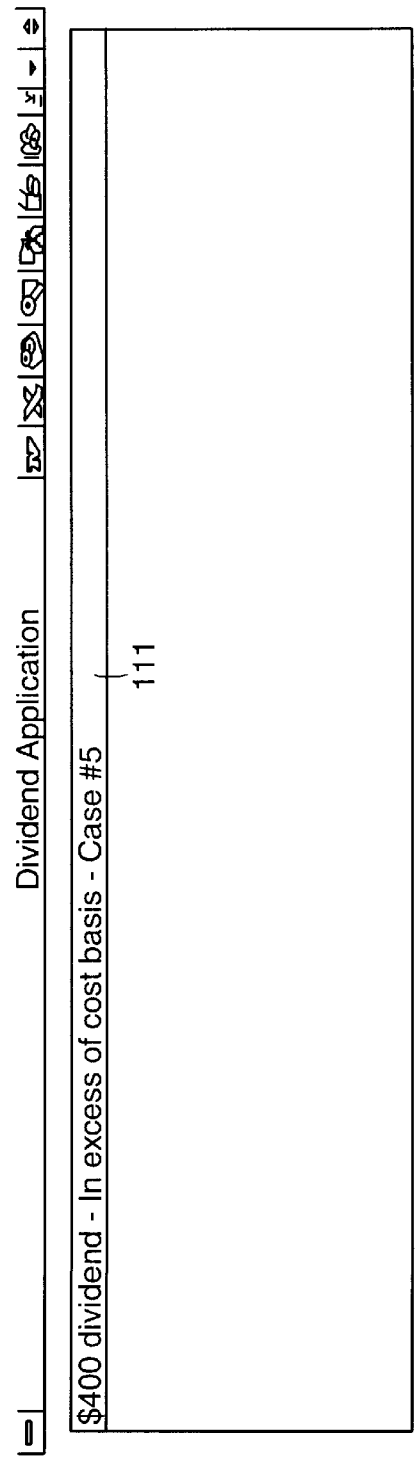

Dividend Application (104). This selects from internal business events where the dividend earned on the policy is reinvested based on the policyholder's dividend option. FIG. 1E shows the one test case available with the demonstration in this category (111).

Other (105). This is reserved for future test cases.

Figure 1F:
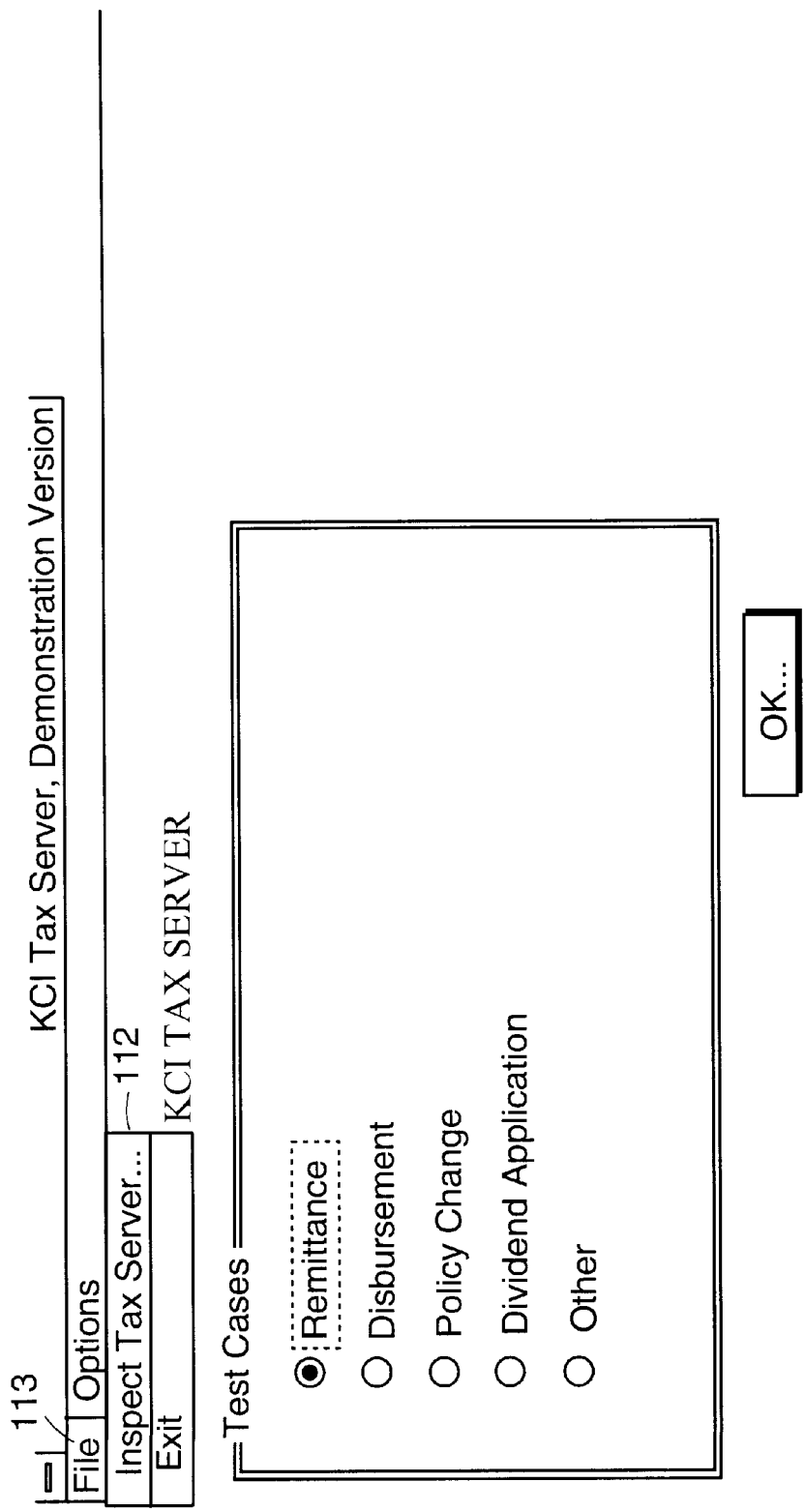

FIG. 1F shows an option under the File (113) selection—Inspect KCI Tax Server (112). This option allows the user to inspect all of the objects resident in the computer memory for a particular run of the Tax Server. This option is useful to demonstrate the internal construction of the Tax Server.

Figure 1G:
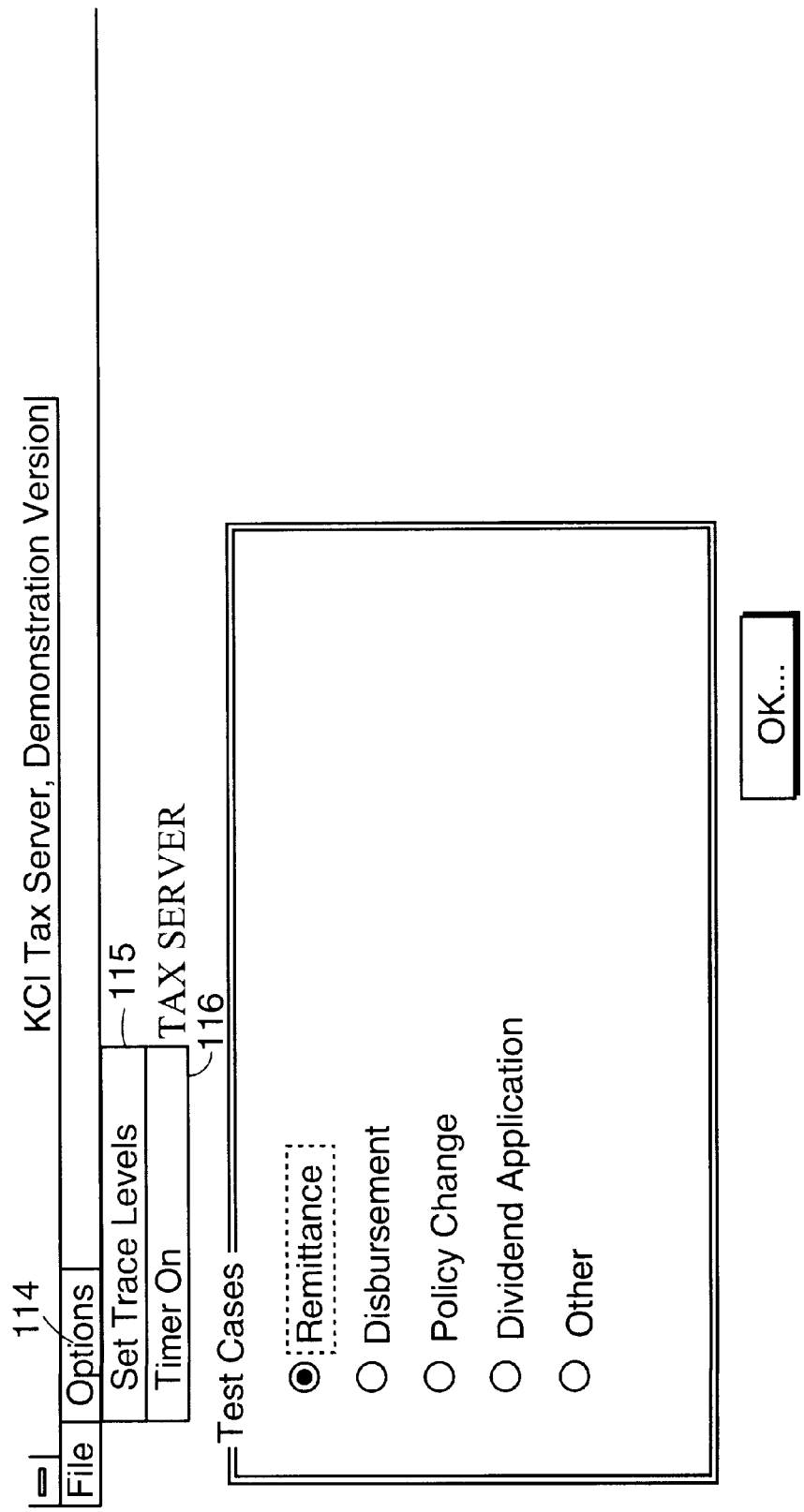

FIG. 1G shows options under the Options (114) selection. Set Trace Levels (115) allows the user to select various trace levels (see FIG. 1H). Timer On (116) allows the user to activate the timer which presents the execution time required for processing a selected business event.

Figure 1H:
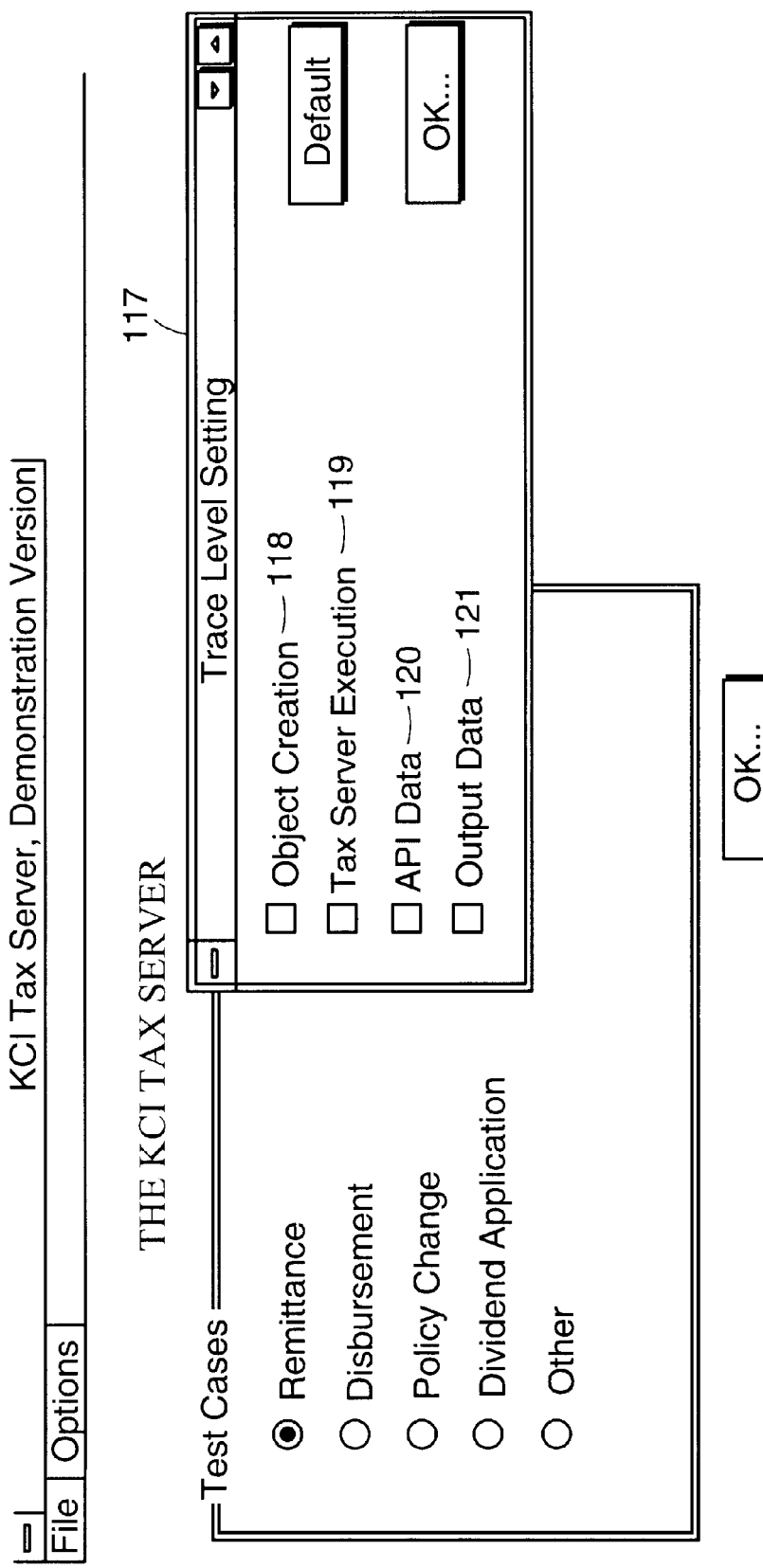
Figure 2:
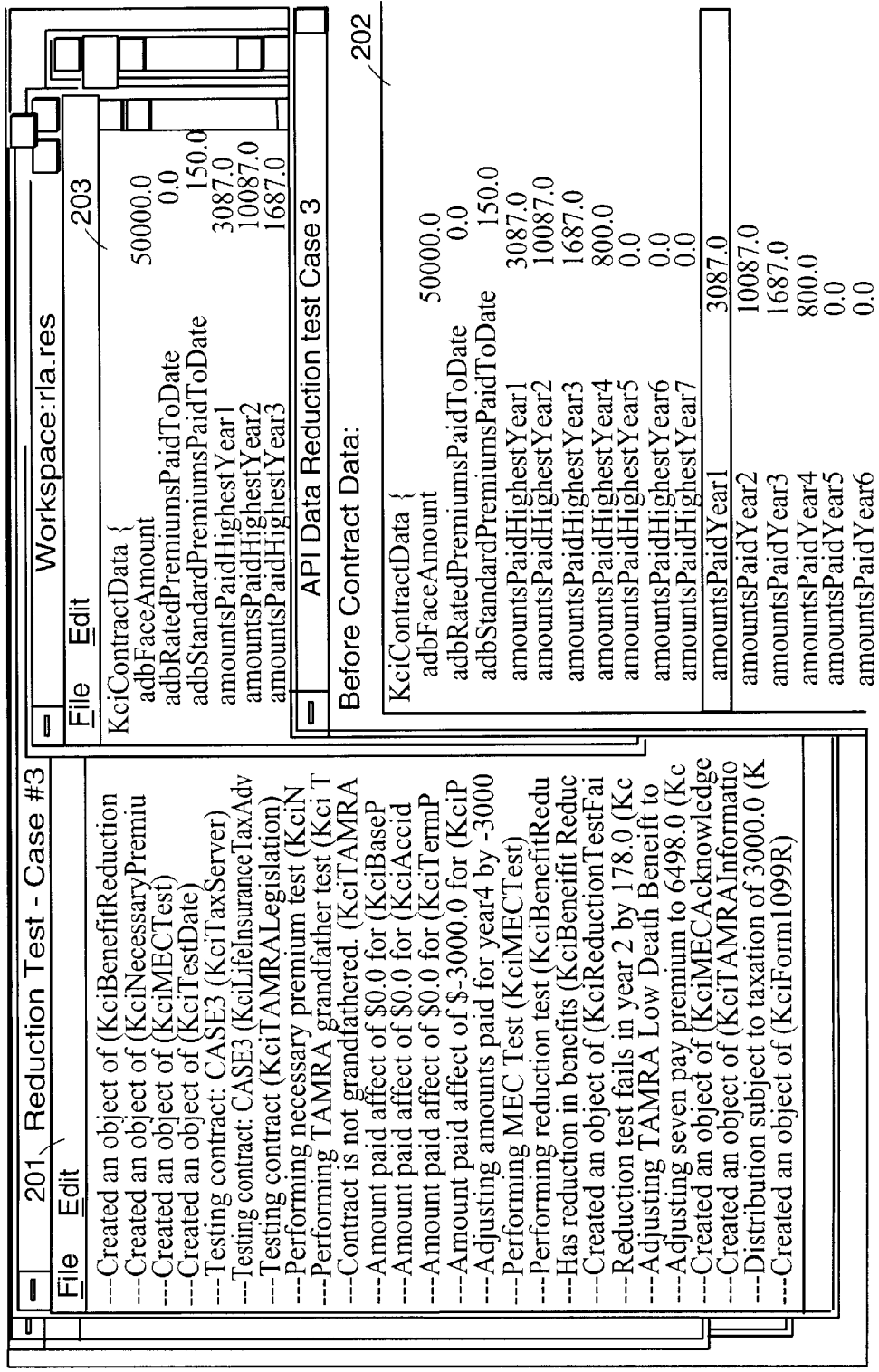
FIG. 2 illustrates a screen output from running a test case through the Tax Server.

FIG. 1H shows the various trace options available for the demonstration. The Trace Level Setting window (117) is presented when the user selects Set Trace Levels (115). Available trace options are:

Object creation (118)—the trace window will show when all objects get created by name KCI Tax Server Execution (119)—the trace window will show key processing points in the execution of a business event API Data (120)—the before and after image data are presented to the screen and differences are highlighted Output Data (121)—the altered contractual data is printed to the screen FIG. 2 illustrates a screen output from running a test case through the Tax Server. It a screen print of some of the on-screen output from the Tax Server demonstration. Window (201) is a trace window which contains object creation messages and Tax Server execution messages. Window (202) is a window showing before and after contract data, where attributes that changed in the after image are highlighted. Window (203) is a window that shows the changed values of contractual data as a result of running the Tax Server.

Figure 3A:
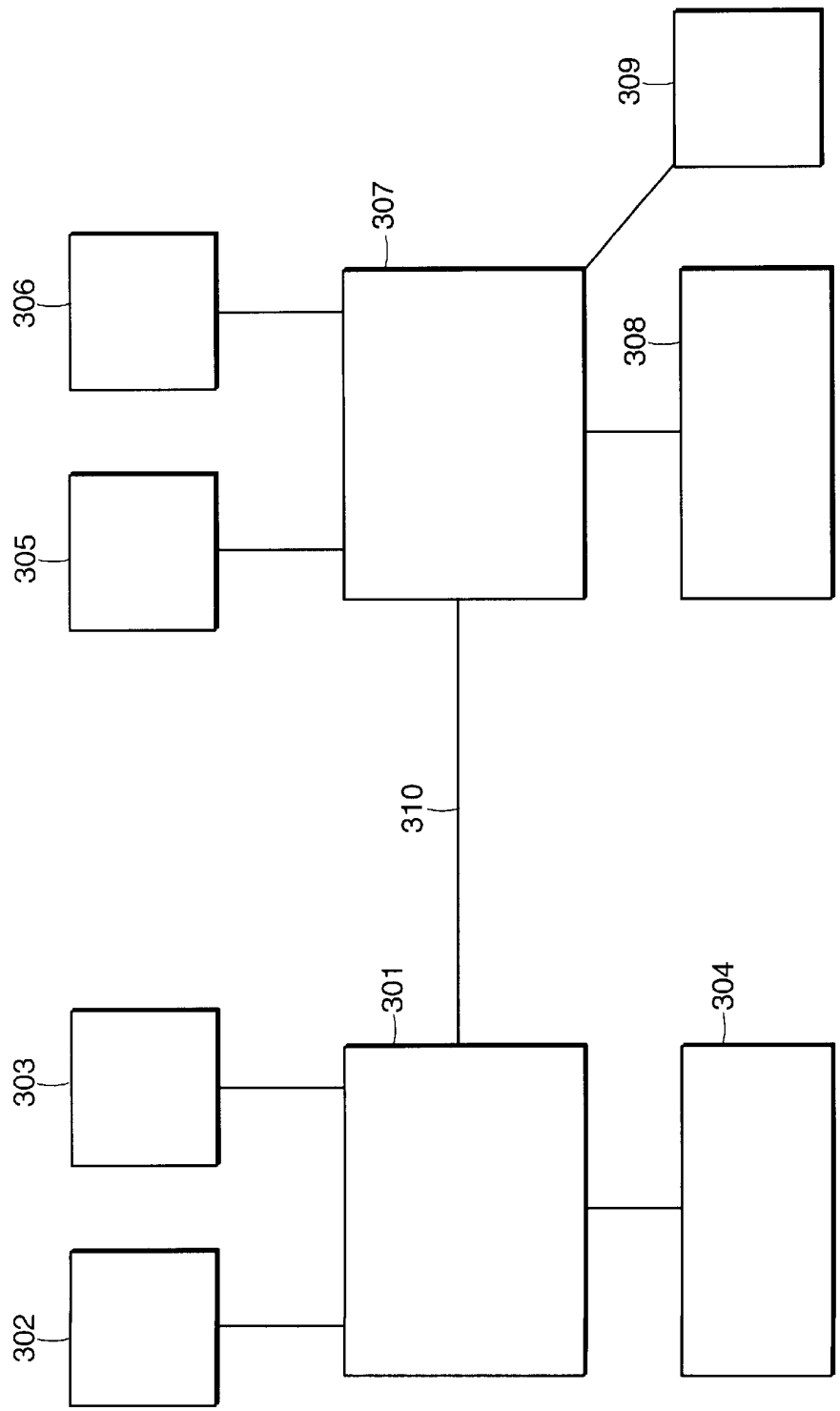
FIG. 3A is a block diagram depicting hardware components utilized by a representative embodiment of the present invention.

FIG. 3A is a block diagram depicting hardware components utilized by a representative embodiment of the present invention. A computer processor (301) is attached to an input device (302) and an output device (303), and a memory (304). The computer processor can be, for example, an IBM compatible personal computer running Microsoft Windows 3.1 on the MS-DOS operating system, or Windows 95, or Windows NT. Additionally, the processor can be an OS/2 or Unix machine or an IBM mainframe. The input device can be, for example, a keyboard and/or a mouse. The output device can be, for example, a computer screen.

The computer processor (301) is coupled via a communication line (310) to a second computer processor (307), also having input (305) and output (306) devices and memory (308) and disk storage (309). The communication line may be, for example, a public telephone line, a T1 line, or a dedicated wide area network. In the representative embodiment, the processor (307) is an IBM mainframe computer, an IBM compatible personal computer, or another type of computer.

In the representative embodiment, processor (307) controls the operation of the Tax Server by sending a message along with a stream of data. Preferably, there is no need for a communications line to another processor, as the Tax Server can run on a single machine.

FIG. 3B is a diagram which depicts a strategic tax subsystem architecture. The diagram shows the strategic application architecture for the tax subsystem. Applications (365) are seen communicating with the Tax Subsystem (364). The Tax Subsystem (364) is made up of Converters (354, 355, and 356), Data (357 and 358), and The Generic Tax Server (366), i.e. the Tax Server. The various software components may execute on a variety of computers. For example, the Applications and Converters can run on mainframe computers, while the Tax Server can run on a Personal Computer.

These components of a computer system all work together to provide the proper functionality to handle tax requirements. These components can be executing on the same or different machines. Each individual component is described more fully, below.

Customer Service (351) is a system that requires tax service. Many companies have customer service systems where policyholders can get quick responses to questions about their policies. The actual workings of this type of system is unimportant for understanding the invention. What is important is that this system requires tax advice for handling a customer inquiry.

When this system requires tax advice, it formats a request and send it along to its Converter. The request can be either a "message," which is made up of a string of data or it can "call" another program, passing along the required information.

Admin (352) is an actual insurance administrative system. This generally runs on a mainframe computer and is written in COBOL. These are generally referred to as Legacy systems. These systems handle much of the policy administration for an insurance company. For example, they process the premium payments, send out bills, perform policy calculations, execute policy changes, etc.

These types of systems typically run as part of a nightly batch system, where all of the day's transactions are applied during a big run during the night. Most of the transactions being processed require some level of tax testing, to ensure compliance with the tax regulations.

Admin (353) is a clone of actual insurance administrative system (352). Many companies have "cloned" their administrative systems. They can have one system that handles the traditional life insurance products, one that handles variable life insurance, one for universal life, and one for annuities.

C.S. Converter (354) is a software component responsible for converting information into a format appropriate for the Tax Server. A specific Converter is required for each Application that is connected. This Converter is the specific one for converting the Customer Service Application. This component is necessary in order to allow the Tax Server to be generic. In order to achieve this goal, the information presented to the Tax Server needs have a common format, and should be presented in business terms (e.g. base policy face amount). In addition, if the Tax Server contained detailed knowledge of a particular administrative system, it would cease to be generic, and its use with other systems will be compromised.

The Converter (354) performs a variety of tasks. It moves data from the format sent by the Application into the format required by the Tax Server. In essence, it loads fields in the request message for the Tax Server. It derives information required by the Tax Server based on data it gets from the Administration system. It may compute additional information that is unavailable. It retrieves tax-related policy information that is stored in the database (Data).

Upon formatting a generic message, the Converter (354) sends this message to the Tax Server for tax evaluation. A message is a form of communication between two software components or objects where both parties understand the format of the stream of data.

Converter1 (355) is similar to the converter (354), except this is the specific Converter for the Admin 1 Application. Each Application will have its own Converter, although pieces of the individual Converters may be usable among each other.

Converter2 (356) is similar to the converter (354), except this is the specific Converter for the Admin 2 Application.

Data (357) is incremental tax related data that is required due to missing data in Admin 1. This data would likely be stored on a computer database, such as IBM's DB2. An important distinction, here, is that the data is not maintained by the Tax Server component. Keeping the data outside of the Tax Server greatly facilitates the interoperation and reusability of the components.

Basically, the additional data that is necessary to retain for tax purposes is directly related to the data that is currently kept inside an existing Application (365). For example, if the Application does not track the "cost basis" field, then this would be carried on the database.

Each Application connected to the Tax Server would likely have its own database. There would be a significant overlap in what is retained across multiple databases, however.

Data (358) is the incremental tax related data that is required due to missing data in Admin 2.

Generic Tax Server (366) is a separate software component, written using object oriented techniques. Object oriented software development is a different method of constructing software compared to the conventional procedural method. The Tax Server is accessed by sending a message. It has access to local files, which primarily store tax rate information (e.g. net single premium rates). It is subdivided into three subcomponents. One component provides a software implementation of the generic tax rules. Another subcomponent provides models of a particular insurance company's life and annuity products contains knowledge of how these products are interpreted in light of the tax law. The third subcomponent provides access to various rates and factors necessary to inforce the tax laws.

The subdividing of the Tax Server in this way is a novel approach which greatly enhances the ability to add new products and extend the tax rules.

Tax Server Application Programming Interface (359) is a component which accepts messages from the Converters to process by the Tax Server and provides replies from the Tax Server to the Converter. There are two primary messages, the request message and the reply message.

The request message consists of generic insurance data. There are three parts of the message:
1. the applicable insurance information for the insurance contract prior to applying the transaction;
2. the applicable insurance information for the insurance contract immediately after applying the transaction; and
3. information about the actual transaction being processed (e.g. the effective date).

The reply message consists of two major parts:
1. the values of the insurance contract's tax information after providing the tax analysis (e.g. cost basis); and
2. other information not directly associated with the contract that is useful for tax analysis.

The type of data provided is described below in FIGS. 13A–13B, which provides an example of a representative request message. The test cases in FIGS. 14A–14F indicate the type of data that might go into the messages.

Inside the Tax Server, some output information is modeled as conceptual output (360). That is, the application considers it "output" in the sense that it represents results of the application, but it is not produced in any hard form (i.e. it is not printed on paper). The type of output of the Tax Server includes updated contractual attributes and 1099-Form and TAMRA/MEC information. Ultimately, any meaningful information contained in the output will be returned in the reply message.

Tax Rules and Regulations (362) is a subcomponent in the Tax Server which provides software objects that model the generic tax code. Objects exist that model various sections of the Internal Revenue Code. This subcomponent interoperates with a Tax Enabled Insurance Product Model (363), below, to perform the appropriate tax testing. The details of this subcomponent are described more fully in FIG. 4.

Figure 4:
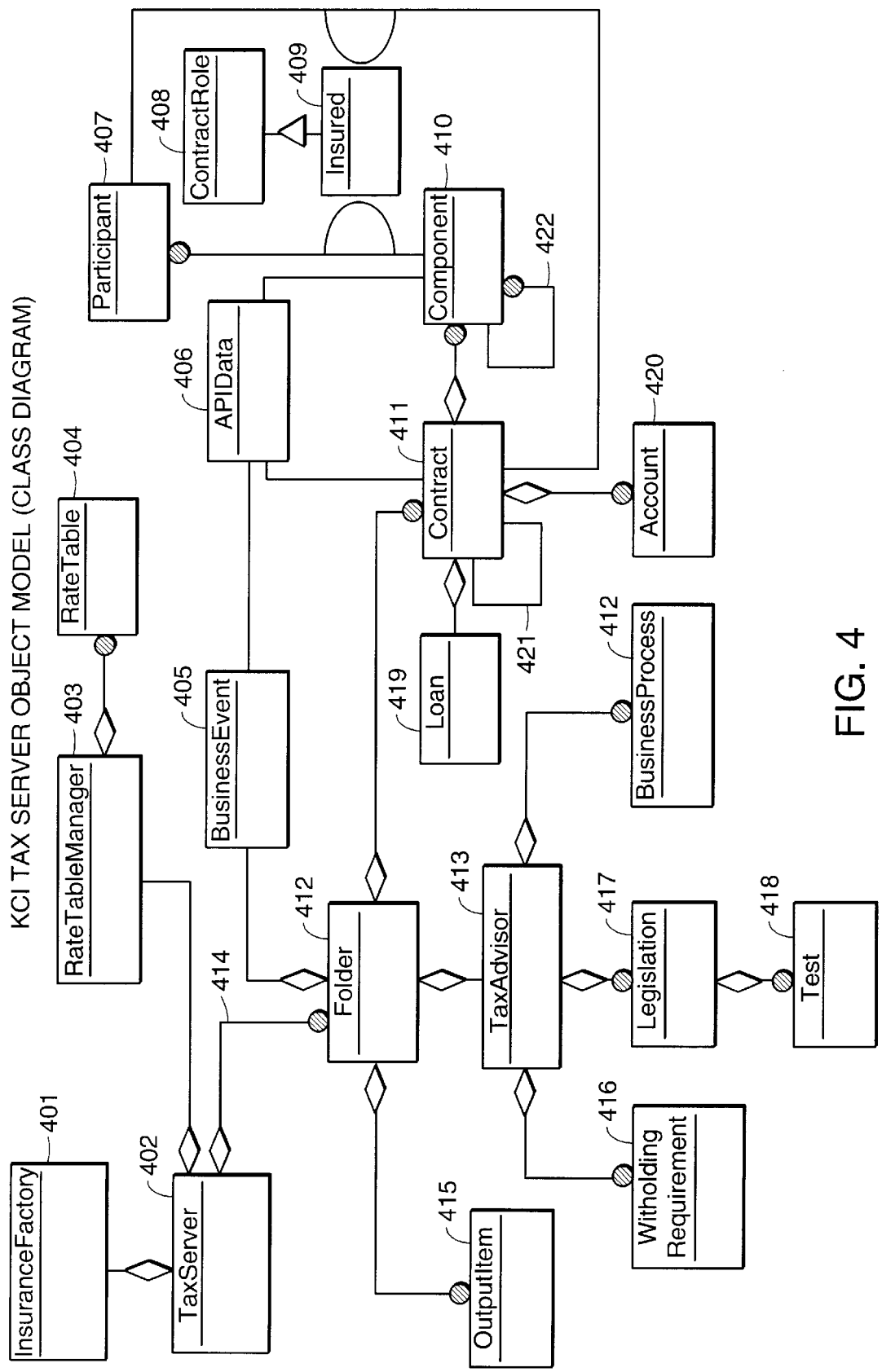
FIG. 4 is a high level object model illustrating the static relationships among the high level classes in a preferred Tax Server.

The Tax Enabled Insurance Product Model (363) is a subcomponent in the Tax Server which provides objects that represent an insurance company's products, and how their properties are interpreted in the context of the tax law. This subcomponent will contain software objects that model traditional life, variable life, universal life, and annuity products and their associated riders. For the most part, these models do not contain "product rules," as these are already contained in the administrative systems, and therefore would be redundant. FIG. 4 provides further detail of this subcomponent.

Tax Rates (367) are a series of numbers that vary by product, insured sex, and insured age. These rates are used in the calculation of many of the tax rules.

The following narrative provides an example of how a typical transaction would be handled by the tax subsystem:
1. Admin 1 (352) requires tax analysis and formats a request to send to the Converter1 (355). This is represented by an arrow (368).
2. Converter1 (355) begins to build the message for the Tax Server. It retrieves data from the database (357), represented by an arrow (369). Data is returned (370).
3. The message is sent to the Tax Server, represented by an arrow (371).
4. The Tax Server receives the message and makes it into objects.
5. Once the objects exist, the message is sent to the Tax Rules subcomponent, represented by an arrow (372).
6. The various objects work together to handle the request. This is signified by arrows (373), (374). Also rate table information is retrieved from the rate database (367).
7. Output (360) objects may be created (375).
8. The information is flattened from objects to a message (359).
9. A reply message is sent to the Converter1 (376).
10. The Converter1 stores the appropriate results (369) in the database (357).
11. The response is returned to the originating application (352) by message (377).

FIG. 4 is a high level object model illustrating the static relationships among the high level classes in a preferred Tax Server. This diagram shows the relationship of various classes in the system. A class is a definition of what an object would be. It describes the attributes and behaviors of an object. For example, Person might be a class that describes the details of a person object. A real person, would be an object (or instance) of the class Person. A real person would have a name, sex, age, etc.

Figure 12:
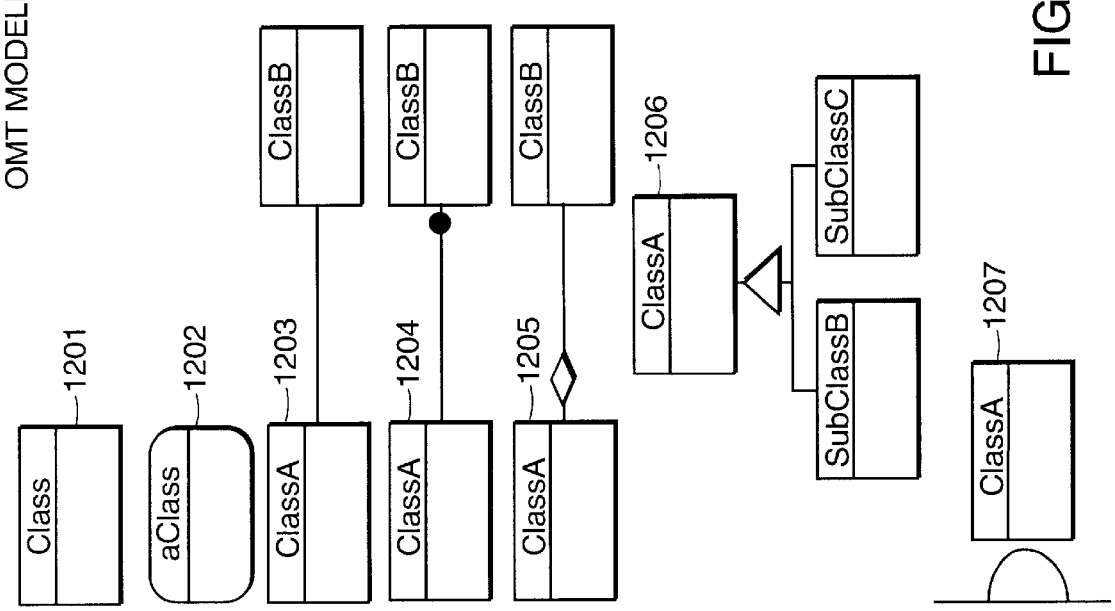
FIG. 12 is a key to the Rumbaugh OMT (Object Modeling Technique) notation.

FIG. 12 describes the notation used in FIG. 4. Classes have relationships with other classes (as depicted by lines between the boxes). Relationships could be one to many, many to many, etc. Classes may be "contained" inside others, as depicted by the diamond. The triangle indicates a sub-class/super-class relationship, where more specialized classes may "inherit" behavior from more generalized classes.

The class diagram shows how objects are related during execution of the software program, thereby indicating their static relationships. This diagram does not indicate the processing flow of control. In a particular computer source code implementation of this model, all class names are prefixed with Kci (e.g. KciTaxServer) to minimize naming conflicts with other objects that may be present in the environment.

For the remainder of the description of this figure, the actual objects will be referenced and described, rather than referring to the classes that they are created from.

The diagram shows that a TaxServer (402) object will contain one InsuranceFactory (401) which it will use to create other business objects. The business objects are the objects that are found in the insurance domain. There include the Contract (411) and the Components (410). The TaxServer also contains one RateTableManager (403), which is used to manage the access to various rate tables. Finally, the TaxServer contains one to many Folders (414), enabling it to multiprocess, if necessary.

The ability to multiprocess (or multi-thread) allows the Tax Server to process many transaction simultaneously. This results in faster system performance.

All outside access to the Fax Server comes through this object (402). This serves to encapsulate (hide) the rest of the Tax Server from client applications. This design technique is sometimes called a "facade," and is useful for enabling reusable software components.

An InsuranceFactory (401) object creates other objects, much like a factory makes things. For the most part, it create the objects that are representative of things in the real world, which are those that model insurance products and riders. It has the intelligence to figure out what type of data is coming in and create the other objects appropriately. The design technique employed, here, is to use an "abstract factory." An abstract class is one that provides general behavior and attributes. Abstract classes are not instantiated, themselves.

Rather, they provide behavior that is inherited by subclasses. The sub-classes are generally instantiated—meaning objects are created from the class. Classes from which objects can be created are often called "concrete classes."

Therefore, the real object created is a distinct factory for a particular type of insurance products. For example, subclasses of InsuranceFactory are TraditionalLifeInsuranceFactory (538 of FIG. 5A), InterestSensitiveLifeinsuranceFactory (539 of FIG. 5A), and AniuityFactory (540 of FIG. 5A). Only one factory object will be created per transaction sent to the Tax Server.

Once the objects are created, the InsuranceFactory does not play any role in performing the tax analysis.

A RateTableManager (403) object, along with a RateTable (404), make up the rate management subcomponent. This object will maintain multiple RateTable (404) objects. A RateTable object is created when the application needs a particular rate from a particular table. When it is created, it will be read from the computer's disk. This is typically a slow process, so once it is created the RateTableManager will keep track of it for future accesses for future transactions. The RateTableManager is not created anew for each transaction. Only one RateTableManager object lives in the run-time system. This is often called a "singleton" object.

Figure 5A:
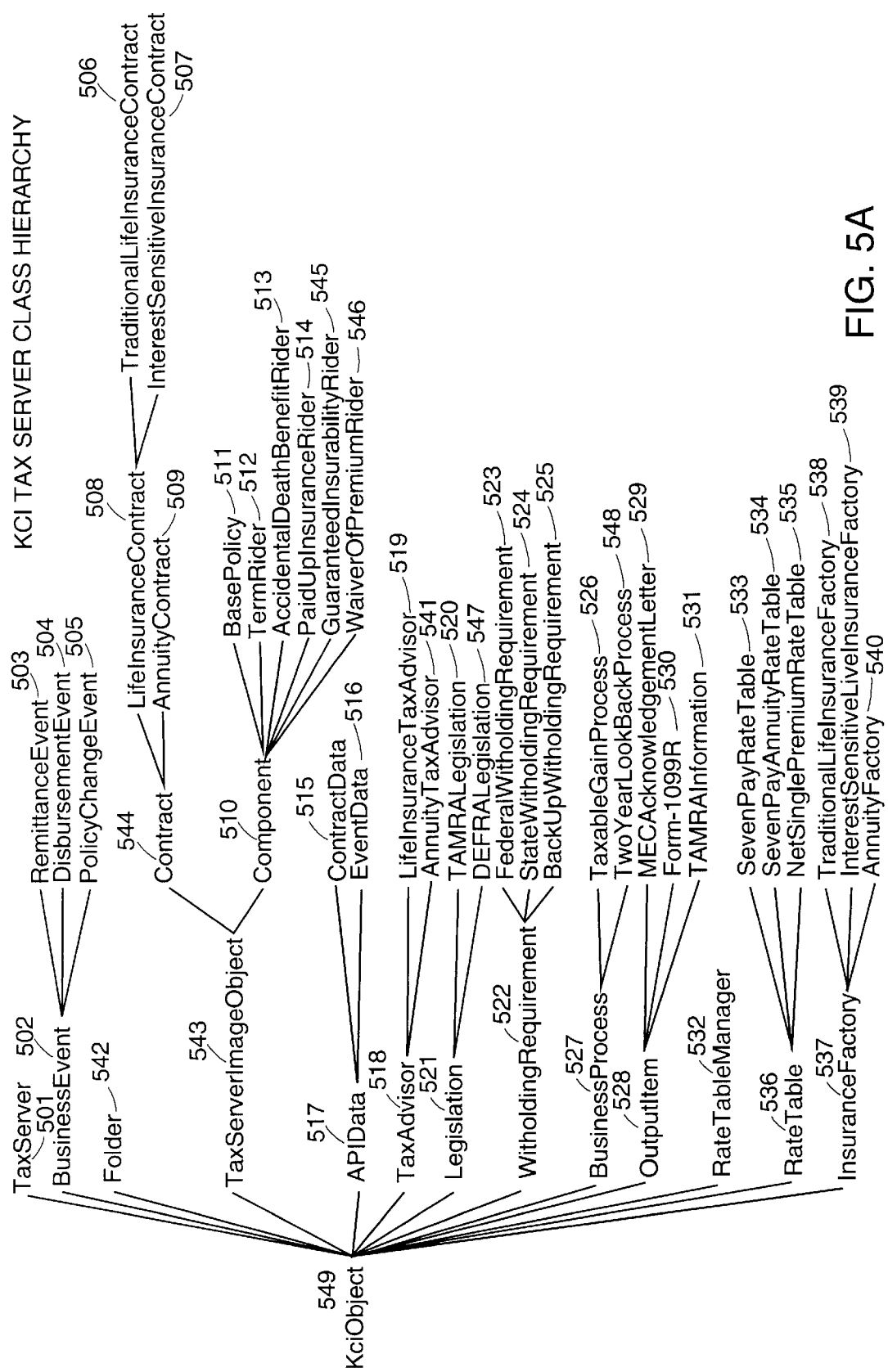
FIGS. 5A and 5B depict a class hierarchy of the classes of FIG. 4.

A RateTable (404) object models a particular rate table used for tax testing. FIG. 5A shows three rate tables, SevenPayRateTable (533), SevenPayAnnuityRateTable (534), and NetSinglePremiumTable (535) required for implementing the TAMRA legislation. These table objects can provide their values internally, or they could read the information initially from a data store. Other rate tables could be modeled in a similar manner.

A Folder (414) class has no subclasses. A Folder (414) object serves as the primary container for the key objects associated with a message being processed by the Tax Server. A Folder object contains five primary things: two Contract objects (411) (one before image Contract and one after image Contract), one TaxAdvisor object (413), one BusinessEvent object (405), and a collection of OutputItem objects (415). All of these objects are used to do tax testing. The Folder object facilitates navigation among the various objects. For example, if a Contract needs to deliver a message to the BusinessEvent, it will get the BusinessEvent's address from the Folder.

The Folder can be thought of as a manila folder containing objects associated with the particular transaction/event.

Information pertinent to a business event is captured on a BusinessEvent (405) object. Three primary types of business events are shown. They are RemittanceEvent (503 of FIG. 5A), DisbursementEvent (504 of FIG. 5A), and PolicyChangeEvent (505 of FIG. 5A). A remittance is a premium payment, which occurs when someone pays money to the insurance company. A disbursement is a withdrawal or partial surrender, which occurs when a policyholder requests for money to be removed from the contract. A policy change (or contract change) is some type of change to the policyholder's contract, generally performed at the request of the policyholder. For example, a rider can be added or dropped, or the amount of insurance can be increased. Other possible business event objects include:

PolicyLapse
Reinstatement
Monthiversary (deduction of monthly charges)
FullSurrender
PolicyLoan
LoanRepayment
Assignment
PolicyIissue A Contract (411) is a "composite" object that contains all of the components of an insurance contract. It can contain one to many Component objects (410). It also could contain a Loan (419) object and/or Account (430) objects (interest sensitive contracts contain Accounts). In addition an after image of a Contract knows about the related before image of the Contract. This is represented in the diagram by line 421. This part enables the before and after comparison. A Contract also maintains a pointer to an APIData (407) instance (in this case a ContractData object (515 of FIG. 5A)), where it gets its data from. A pointer is a reference to another object, which permits sending messages to the other object.

A Contract object fields requests made by the TaxAdvisor object (413). It provides information required for tax processing that is product related. For example, a Contract would have a "cost basis" and know what its "TAMRA death benefit" is.

The after image Contract often sends message to its related before image Contract (another object) to determine how things have changed as a result of processing the business event. For example, the death benefit or the total premiums paid may have changed.

A couple of noteworthy methods on the Contract (411) object are:
1. linkToBeforeImage: aBeforeContract—this is the method that accomplishes the linking between and after image contract and a before image contract. This method also iterates among all Components and links them as well. The Smalltalk pseudo-code that implements the method is:

self objectCoupler relatedBeforeImageObject: aBeforeContract for each in components
   each2=aBeforeContract findSameComponent: aComponent if each2 not Nil then each linkToBeforeImage: each2 end 2. costBasisEffectOfEvent—This method determines the effect on cost basis for the event that was applied. This method iterates through all components and sums up the costBasisEffectOfEvent of each Component. This method implements the design techniques described in many of the previous figures.

The Smalltalk pseudo-code that implements the method is:

if self isBeforeImage then "errir"
   for each in components

CHANGE=CHANGE+each costBasisEffectOfEvent end
   return CHANGE

Subclasses of Contract referenced in FIG. 5A include a LifeInsuranceContract (508), a TraditionalLifeInsuranceContract (506), an InterestSensitiveInsuranceContract (507), and an AnnuityContract (509).

Each subclass would contain behavior that is specific to that type of contract. For example, the TAMRA legislation only applies to life insurance (not annuities). Additionally, TraditionalLifeInsuranceContracts are subject to different tax rules that InterestSensitiveInsuranceContracts.

A few noteworthy methods on the LifeInsuranceContract (508) object are:
1. dividendPaidThisEvent—This method implements the change in dividends paid for the event. It does it by comparing its dividendsPaidToDate with its related before image Contract's dividendsPaidToDate. The difference between the two numbers is used in the cost basis determination. The Smalltalk pseudo-code that implements the method is:

self dividendsPaidToDate-self relatedBeforeImageObject dividendsPaidToDate 2. isDeemedMaterialChanged—This method is a good example of how tax knowledge is distributed among the insurance products. Here, a TaxAdvisor through one of its Tests will ask a LifeInsuranceContract if it has a "deemed material change." The definition present here satisfies that request by iterating through the Components, asking each one if it has a deemed material changed. Individual Components have different tax rules about what constitutes a deemed material change. The Smalltalk pseudo-code that implements the method is:

for each in components
  if each isDeemedMaterialChanged=TRUE
    then return TRUE
end A Component (410) object is model of some element of an insurance contract. These are usually the "products" offered by an insurance company, but they can also be internal components. Each after image Component has a pointer to the related before image, so that it can perform tax analysis of what changed during the business event. This is represented in the diagram by line 422, and is a fundamental design technique employed in the Tax Server. Each Component may have an Insured object (409), which in turn relates to a Participant (406).

Actual Components referenced in FIG. 5A include a BasePolicy (511), a TermRider (512), an AccidentalDeathBenefitRider (513), and a PaidUpInsuranceRider (514). Additionally, other Components include:

GuaranteedInsurabilityRider (545)
ChildRider
SpouseRider
WaiverOfPremiumRider (546)
AccumulationAccount
OneYearTermRider
DecreasingTermRider
LevelTermRider
DisabilityBenefitRider
ApplicantDisabilityBenefitRider
LossOfEyeAndLimbRider
DividendAdditions A few noteworthy methods on the Component (410) object are:
1. new—This method performs the attachment of an ObjectCoupler (614) object upon creation of the Component. The ObjectCoupler will be used to assist the state comparison of after and before image objects.

objectCoupler new 2. linkToBeforeImage: anObject—This method performs the physical linking of an after image Component object to a before image Component.

self objectCoupler relatedBeforeImageObject: anObject 3. setImageType: aContractData—This method instructs an ObjectCoupler whether it is being used by an after or before image object.
  if aContractData isBeforeImage=TRUE
    then self objectCoupler setToBeforeImage
    else self objectCoupler setToAfterImage 4. isIncludedInCostBasis—This method is one of the many "predicate" methods which put tax knowledge into the insurance product (Component) objects. Here, a default is not known, so each subclass of Component will have to provide its interpretation of this method. Generally, they will either define the method to return TRUE or FALSE.

self subclassResponsibility 5. isNew—This method is another example of how the state change approach simplifies the processing. Here, a Component will respond to the question "are you new" with either true or false. It does this by examining itself to see if it is an after image object and then looks to see if the before image object is non-existent. If both of these are true, then it is a new Component which was added during the business event, such as adding a term rider.
  if self isAfterImage and self relatedBeforeImageObject is Nil then TRUE else FALSE 6. costBasisEffectOfEvent—This method is an example of the state based change technique. Here, the method calculates the increase in cost basis from an event by comparing the premiumsPaidToDate with the premiumsPaidToDate of the related before image Component. It also checks to make sure that the before image object is not Nil (where Nil means it does not exist). A missing Component could happen if the business event is to add a new insurance component, like a rider.
  TMP=self premiumsPaidToDate
  if BEFORE=self relatedBeforeImageObject not=Nil
    then TMP=TMP-BEFORE premiumsPaidToDate
    return TMP 7. hasFaceAmountIncrease—This method is another example of how the state change approach simplifies the processing. Here, a Component will respond to the question "do you have a face amount increase" with either true or false. It does this by examining its (the after image) face amount and comparing it to the face amount of its related before image Component. By retaining the core insurance information on each Component (before and after), many types of business rules can be easily encoded.
  aBeforeObject=self relatedBeforeImageObject
  if aBeforeImageObject not Nil
    then if self faceAmount>aBefore faceAmount
      then return TRUE
      else RETURN false A few noteworthy methods on the BasePolicy (511) object are:
1. isDeemedMaterialChanged—This method exploits the state change technique provided by the method hasFaceAmountIncrease. The business rule depicted here is that a BasePolicy is considered "materially changed" if either it is new or its face amount has increased. Both isNew and hasFaceAmountIncrease utilize comparison of the after and before image information. These methods were described, above.
  if self isNew or self hasFaceAmountIncrease
    then TRUE else FALSE 2. isincludedInCostBasis—This method simply returns TRUE. It is an example of putting tax interpretation knowledge into the products (Components). Here, the premiums paid for the BasePolicy are included in the cost basis of the contract.

return TRUE

Some insurance contracts contain cash value in separate accounts. This is typically true for variable, universal, and variable/universal life contracts. These accounts can also contain sub-accounts, which allow for investing in mutual funds or more conventional bank accounts. An Account (420) object, if present, will manage the money contained in the contract. Changes in the Account's value will trigger some of the tax analysis. For example, when the balance of the Account goes down (when compared to the before image Account balance), this will signal a distribution, which could arise in a tax liability.

A Loan (419) object represents an outstanding liability against the insurance contract. A policyholder can borrow against the cash value of their policy. A Loan object will know its outstanding balance, its interest due, and any interest that will be credited. In addition, a Loan will know tax rules that are specific to loan transactions. For instance, a Loan object might know that taking a loan is a possible taxable event if the contract has been classified as a Modified Endowment Contract.

An OutputItem (415) object represents a conceptual piece of output. The Tax Server itself is not responsible for printing output. Rather, it returns output information via a message.

The types of OutputItem objects include MECAcknowledgementLetter (521 of FIG. 5A), Form-1099R (530 of FIG. 5A), and TAMRAInformation (531 of FIG. 5A). Additionally, other output items could include: Form 1099INT and Form 1099MISC.

A TaxAdvisor (413) is the central object with generic tax knowledge. It contains other objects to assist its determination of tax processing. It may contain multiple Legislation (417) objects, multiple BusinessProcess (412) objects, and multiple WithholdingRequirement (416) objects. In addition it operates with a Contract object to perform various tax testing. The primary public message that this object responds to is "testContract." Two types of TaxAdvisors are possible—a LifeInsuranceTaxAdvisor (519 of FIG. 5A) knows the laws associated with life insurance whereas an AnnuityTaxAdvisor (541 of FIG. 5A) knows about annuity related tax law. Law common to both product lines is contained in the super class (TaxAdvisor).

Other possible types of tax advisors include those for evaluating mutual fund and financial security transactions.

The TaxAdvisor will handle the testing of an insurance contract following the application of a particular business event. It will execute various tax rules and pieces of applicable legislation as it sees fit. The TaxAdvisor will also send messages to the after image Contract object (411) to receive product sensitive tax implications.

The Tax Server models knowledge about withholdings requirements in WithholdingRequirement (416) objects. FIG. 5A shows three detailed WithholdingRequirements: FederalWithholdingRequirement (523), StateWithholdingRequirement (524), and BackUpWithholdingRequirement (525).

A WithholdingRequirement is responsible for the possible withholding of money when a distribution results in a taxable amount. For example, federal law stipulates that 10% of a taxable amount must be withheld from a distribution if the policyholder has not provided their social security number to the insurance company.

This class models various Internal Revenue Code legislation applicable to the domain. The primary Legislation (417) object is a TAMRALegislation (520 of FIG. 5A), which reflects the law as state in section 7702A of the Internal Revenue Code. Legislation objects contain one to many Test (518) objects. Tests reflect portions of the Internal Revenue Code, and are generally described in section or subsections of the Internal Revenue Code, or in separate conference committee reports or revenue rulings. Other subclasses of Legislation may include:

TEFRALegislation
DEFRALegislation
ERISALegislation
Section72(e)
Section1035, etc.

Notable methods on the TAMRALegislation object are:
1. initialize—This method creates and attaches detailed test objects required to implement the TAMRA tax law. Here, the following tests are created:

TAMRAGrandfatherTest
MaterialChangeTest
SevenPayTest
BenefitReductionTest
NecessaryPremiumTest
Smalltalk pseudo-code:
   grandfatherTest=TAMRAGrandfatherTest new
   grandfatherTest initialize: self
   materialChangeTest=MaterialChangeTest new init
   sevenPayTest=SevenPayTest new init
   benefitReductionTest=BenefitReductionTest new init
   necessaryPremiumTest=NecessaryPremiumTest new init
   MECTest=MECTest new init 2. testContract—The primary method for TAMRA testing. This is the main processing for applying the rules in the proper order. Here, we test to see if the contract is already a MEC, then perform material change testing, then perform grandfather testing, then update amounts paid, then perform the MECTest. If this fails we perform the MEC procedure and product appropriate output.

Figure 5B:
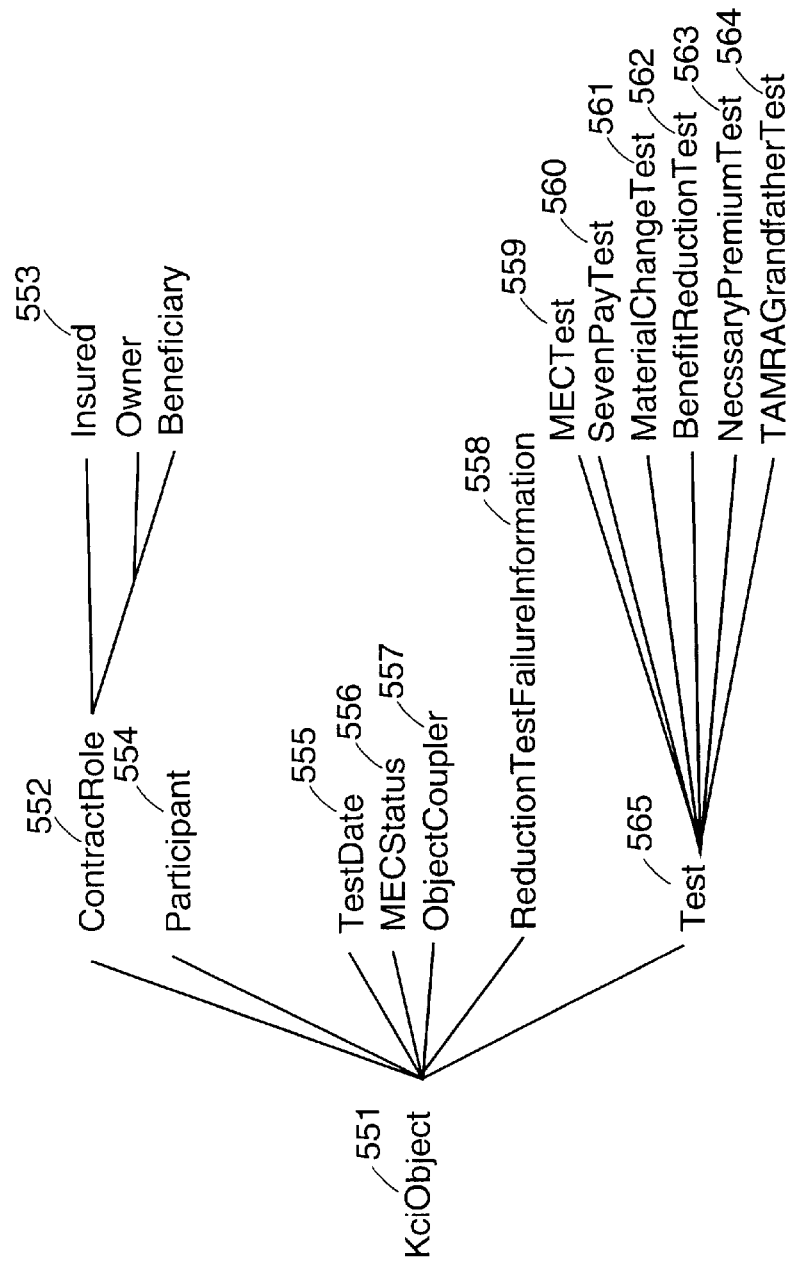

The Test (418) objects model a particular test identified in the Internal Revenue Code. The TAMRA legislation has many tests. All tests respond to the message "perform." FIG. 5B shows the detailed tests. They include: MECTest (559), SevenPayTest (560), MaterialChangeTest (561), BenefitReductionTest (562), NecessaryPremiumTest (563), and TAMRAGrandfatherTest (564).

Overall, the Legislation object decides which tests apply and then asks them to perform. A Test object will normally indicate its status, such as 'pass' or 'fail.' Each Test object contains detailed information and calculations necessary to implement the required test.

BusinessProcess (412) objects model a distinct calculation process required for tax processing. FIG. 5A shows a distinct process of TaxableGainProcess (526), which figures out how much of a distribution is taxable, based on tax rules. Other subclasses of BusinessProcess may include a TwoYearLookBackProcess object, which implements part of the law which stipulates that under some situations, transactions for the previous two years be re-looked at, using a different taxation method.

An Insured (409) class contains the underwriting characteristics associated with a Participant (407) and a Component (411) object. Because policyholders can add pieces of insurance (Components) to a Contract at various times, underwriting information may change. For example, a policy could be issued when the person is age 35. Two years later, at age 37, the insured may request adding a tern rider. Their health may have deteriorated in that time, which may impact the tax calculations necessary. Insured (409) is a subclass of ContractRole (408).

A ContractRole (408) class models a particular role that a Participant might have with an insurance contract. The primary role required by tax processing is Insured (409), but other roles are:

Beneficiary
Owner
Payor
Applicant

A Participant (406) class models a party involved in the contract. It is usually either an organization or a person. Multiple Participants may be involved in a contract. E.g. the primary insured and the spouse could be two Participants.

An APIData (407) class serves as a repository of the data which is submitted with the request for tax processing. (API is an abbreviation for Application Programming Interface). There are two types of APIData objects, ContractData (515 of FIG. 5A) and EventData (516 of FIG. 5A). Data that arrives in the message is placed in these objects, and ends up going into the business objects.

FIGS. 5A–5B depict a class hierarchy of the classes of FIG. 4. Most of these classes have been discussed in the preceding section, and will not be rediscussed, here. This diagram, called a class hierarchy, shows the inheritance relationship among classes. Inheritance is the property of object technology where common behavior and data can be shared, from super classes. All items on the diagram are "classes." Classes on the right side of the diagram are "sub-classes" of those on the left (super-classes). Sub-classes are more specialized versions of the super-classes.

Additional classes not previously discussed include:

A TaxServerImageObject (543) class is a super class for all of the insurance business objects that will have a before and after image. It provides some of the basis navigational behavior that implements the before and after comparisons.

A KciObject (549) class is the most "abstract" class in the hierarchy. All of the Tax Server classes inherit from this class.

A TestDate (555) object provides data related information required for some of the tests.

A MECStatus (556) object is attached to a Contract. It hides the Contract's MEC (Modified Endowment Contract) status, so that objects requiring that information do not need to know how the MEC status is represented. A Modified Endowment Contract is an insurance contract, as defined in section 7702A of the Internal Revenue Code.

An ObjectCoupler (557) helper object provides the link between after image objects (the Contract (411), Component (410)), Loan (419), and Account (420) objects) and their before image counterparts. It is the glue that provides the capability for the unique state change processing of the Tax Server. An after image object will ask the ObjectCoupler for the address of the related before image object, so that it can deliver messages to it.

This class enables the connection between after image objects and before image objects. This connection facility is put in a separate object, to keep it outside of the insurance business objects, but this is not necessary as the actual business objects could also perform the links directly. An ObjectCoupler is attached to an after image Contract/Component object, and is used to provide navigation to the related before image object.

Notable methods and selected Smalltalk pseudo-code on this object are:
1. isBeforeImage—Responds true or false based on the state of this object.

if self imageType='before then TRUE else FALSE 2. isAfterImage—Responds true or false based on the state of this object.

if self imageType='after then TRUE else FALSE 3. setToBeforeImage—Sets the image type of the Object-Coupler to 'before'.

imageType='before 4. setToAfterImage—Sets the image type of the ObjectCoupler to 'after'.
5. relatedBeforeImageObject—Returns a pointer to the before image object. This method is used by the after image Contract and Component object to which the ObjectCoupler is attached.
6. relatedBeforeImageObject: anObject—A setter method which sets the internal pointer to the object passed in.
   if self isAfterImage=TRUE
      then relatedBeforeImageObject=anObject
   else "error"
7. imageType—Stores the state of the ObjectCoupler
8. relatedBeforeImageObject—The actual pointer stored by relatedBeforeImageObject: anObject.

A ReductionTestFailure (558) object contains information appropriate to a failed BenefitReductionTest (562). It is used primarily for diagnostics, so that useful information about the tests can be returned to the calling Application.

Figure 6:
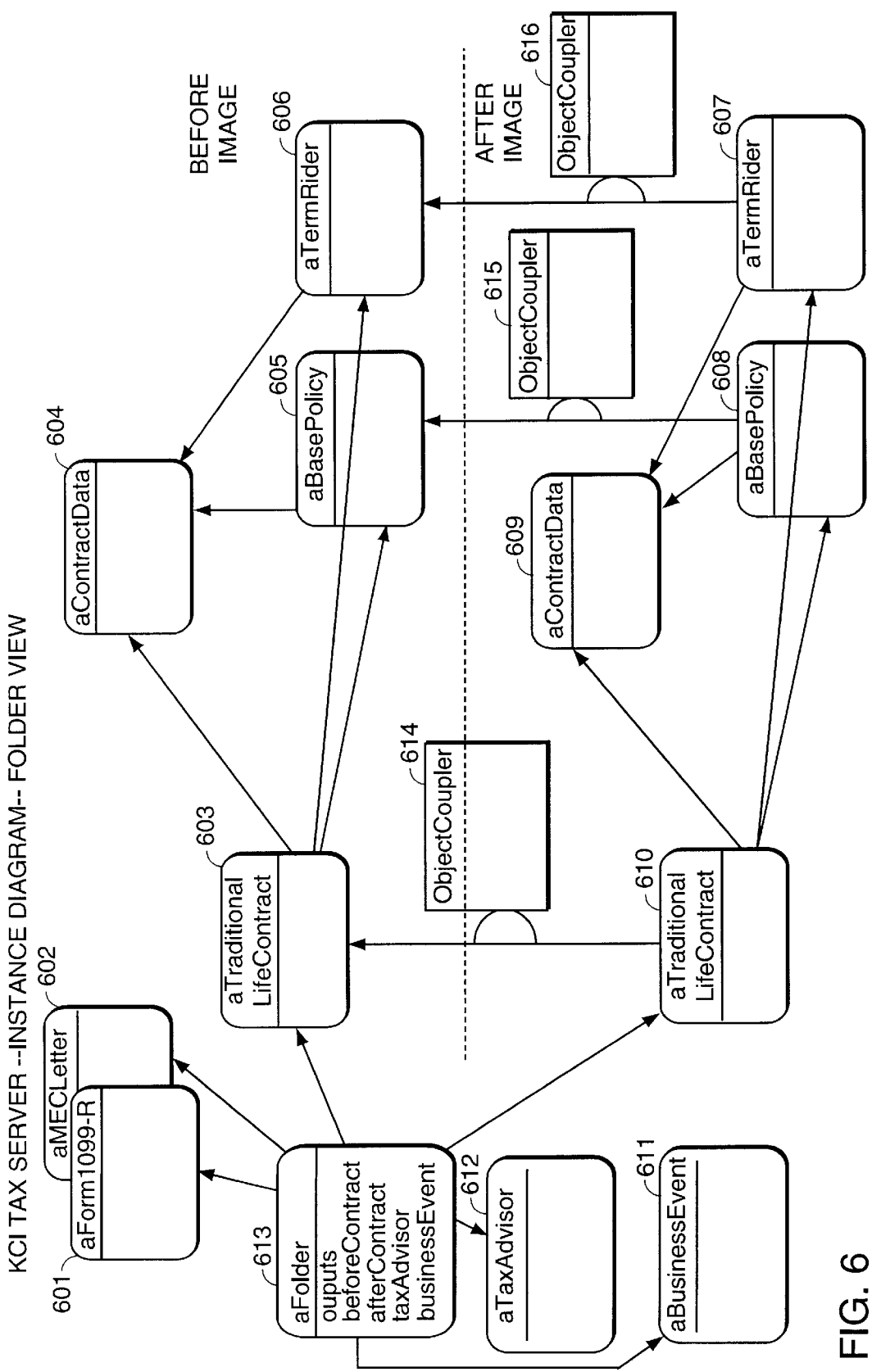
FIG. 6 is an instance diagram illustrating how some of the objects are connected during the program execution.

FIG. 6 is an instance diagram illustrating how some of the objects are connected during the program execution. This diagram is an OMT instance diagram which shows how real objects will be related during the execution of the system. OMT, or Object Modeling Technique, is a methodology for developing object oriented systems. OMT provides a notation for producing various analysis and design diagrams. This figure shows how Contracts and their Components are contained inside a Folder and how the after image of the Contract has access to the related before image.

This figure indicates one of the fundamental techniques that are employed to enable the state change detection which is central to the processing of the Tax Server. This technique allows the Tax Server to figure out what tax processing is required, rather than having to be told what to do. For example, this technique indicates when an insurance contract changes in a substantial way. Substantive changes may result in restarting various tax testing. Conventional approaches to this requirement involve having the originating Application to invoke the proper tax processing based on its assumption that something significant has changed. (This results in the using Application containing too much tax knowledge.)

This technique is appropriate for other "reactive" software systems, where the required processing is after or downstream from the results of the initiating event. For example, this technique would facilitate commission systems and accounting systems, where the necessary processing is dependent of the primary administrative processing.

The diagram indicates the existence of a Folder object (a Folder (613)). A Folder object contains a BusinessEvent object (611), a Tax Advisor object (612), multiple OutputItems (aForm 1099-R (601) and aMECLetter (602)), and two Contract objects (603) and (610). One Contract object (603) represents the image of an insurance or annuity contract before applying the business event. The other Contract object (610) shows how the Contract looks after the event has been applied.

Each Contract object contains Component objects (605, 606 and 607, 608) and APIData objects (604 and 609). In the diagram the Components pictured for the after image of a Contract are a BasePolicy object (608) and a TermRider (607). The before image also contains the same type of Components (605 and 606).

The after image Contract object (610) and each after image Components also contain a reference to its related before image object. These references are inside the objects, as they contain ObjectCoupler objects (614, 615, 616). These are sometimes called "pointers." For example Contract (610) is related to Contract (603), Base Policy object (608) is related to BasePolicy (605), and TermRider (607) is related to TermRider (606). Backward references (from before to after) are not included, as they are not needed for the processing.

A mechanism inside the Tax Server enables the establishment of these pointers when the objects are created (see ObjectCoupler). The ObjectCoupler objects are not pictured in this diagram.

This cross linking inside the Tax Server enables the evaluation of changes in the contract, where Contract and Component objects are able to detect on their own how they have changed from their previous state.

Each Contract and Component object also maintains a "pointer" to a ContractData object (609 and 604). These objects contain the raw data that was provided to the Tax Server when it was asked to perform a service.

Figure 7:
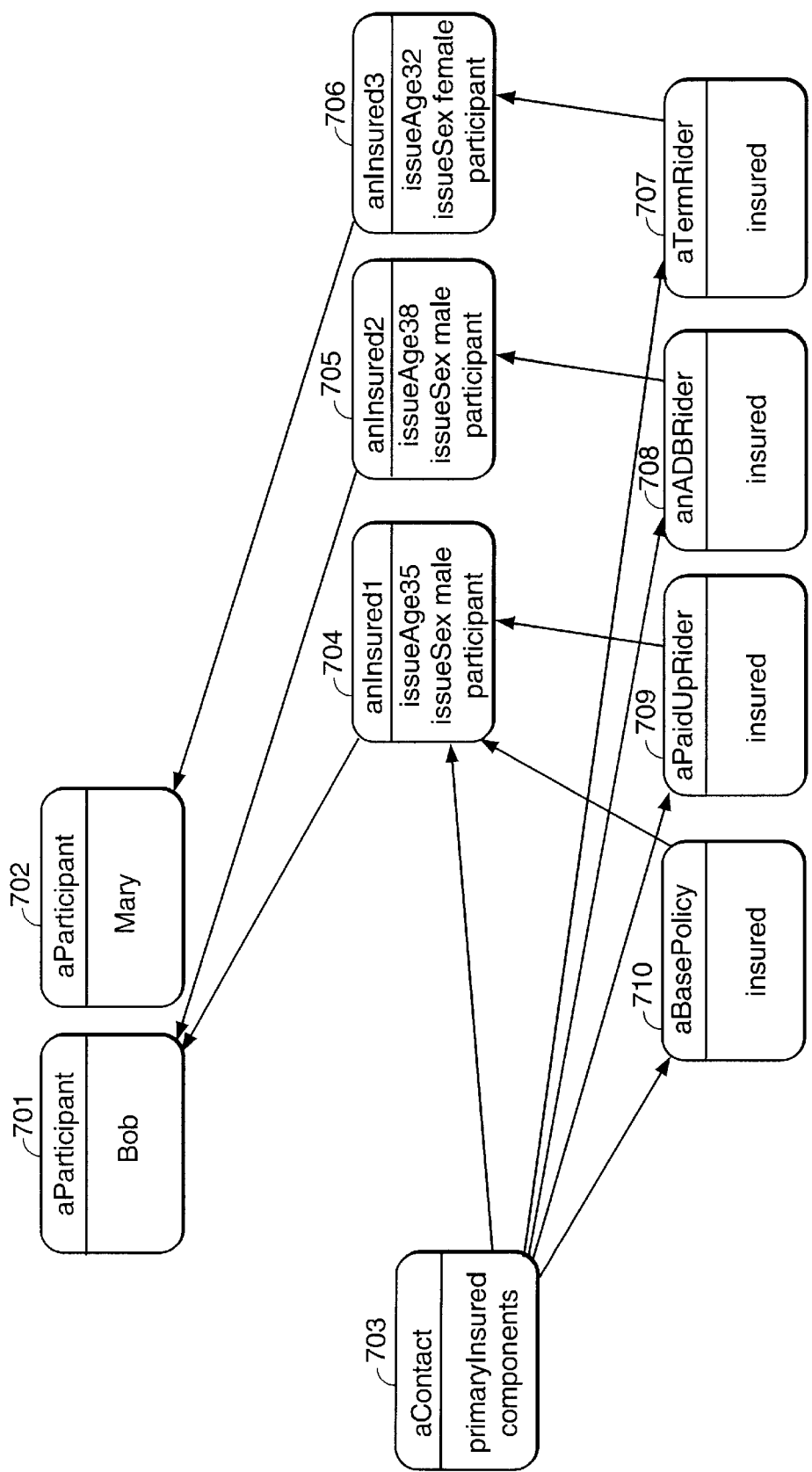
FIG. 7 is an instance diagram illustrating relationships between Component objects, Insured objects, and Participant objects.

FIG. 7 is an instance diagram illustrating relationships between Component objects, Insured objects, and Participant objects. This diagram shows how one of the more complicated areas of object relationships. This deals with how Contract and Components are related to who they insure. A Contract (703) again contains Components (710, 709,708, and 707) and a pointer to an Insured object (704). Each Component contains a "pointer" to an Insured object (704, 705, and 706). Insured objects in turn have pointers to their Participant object (701 and 702), which in this case are people (Bob and Mary).

In this example, two components (710 and 709) were both available when the policy was issued and are insuring Bob (701). Another component (708) was likely added post-issue, as the Insured information (705) differs. Again, it insures Bob. Finally, Bob's spouse, Mary, has a Term Rider (707) on her life, and has her own unique underwriting characteristics represented in Insured (706).

Figure 8:
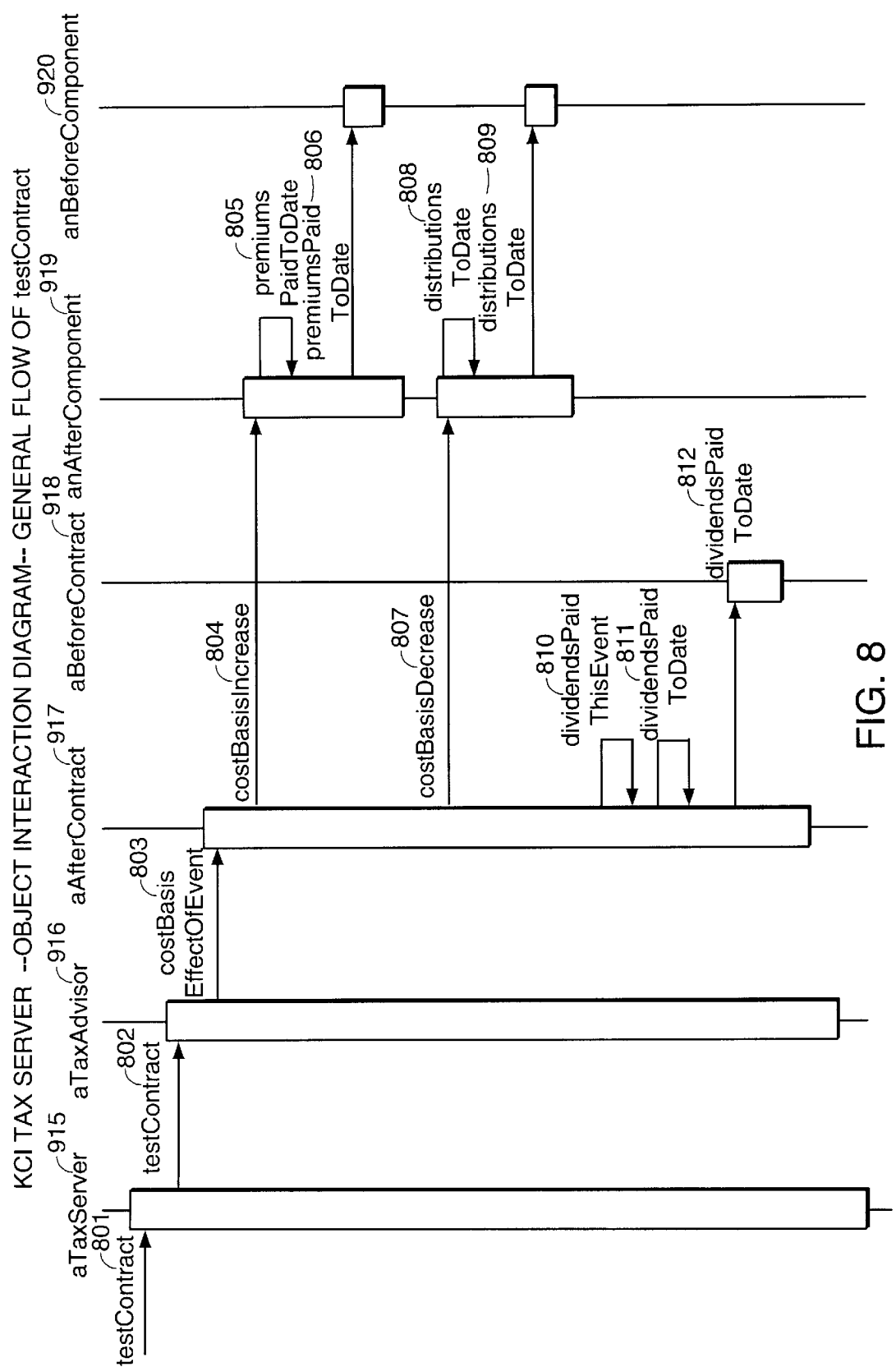
FIG. 8 is an Object Interaction Diagram illustrating a preferred high level processing flow inside the Tax Server.

FIG. 8 is an Object Interaction Diagram illustrating a preferred high level processing flow inside the Tax Server. This diagram indicates one of the primary processing flows through the Tax Server. It is called an Object Interaction Diagram, in that it shows the interaction among objects in order to provide some type of processing. Unlike the static class diagrams, this diagram shows how a subset of the processing is performed. This diagram is similar to a "Flow Chart" in conventional software development.

This diagram shows the processing involved with processing the message "testContract" which is sent to the Tax Server by an outside application. The subset of the processing relates to the adjusting of the cost basis of a contract. In general, the Tax Server adjusts cost basis by examining the impact on cost basis at each component (increase and decrease) and then lowers cost basis by any dividends paid.

Across the top are the objects involved in the processing of this message (815, 816, 817, 818, 819, and 820). Arrows with words assigned represent messages being sent to the objects. The rectangular box under each object represents the amount of time that the give message is processed. (For example, message 801 is active for the entire scenario while message 809 is active for only a moment. The processing indicated by the diagram is:

1. Message testContract (801) is sent to aTaxServer object (815)
2. aTaxServer object (815) sends message, "testContract" (802) to aTaxAdvisor object (816)
3. aTaxAdvisor object (816) sends message "costBasisEffectOfEvent" (803) to after image of a contract, anAfterContract (817), thereby asking a it to determine the effect on cost basis.
4. The anAfterContract (817) object determines the affect by interrogating each of its Components. The anAfterContract object (817) sends message "costBasisIncrease" (804) to an after image Component, anAfterComponent (819). In actuality, this happens for each Component in the Contract
5. anAfterComponent (819), in figuring what money has been paid, sends message "standardPremiumsPaidToDate" (805) to itself, which returns the information that was provided by the calling application. Also, not shown is the determination of ratedPremiumsPaidToDate.
6. anAfterComponent (819) needs to compare this value with the value of its related before image object, aBeforeComponent (820), to determine the change in state resulting from application of the event. It sends message "premiumsPaidToDate" (806) to itself, which returns information.
7. Finally, information is returned to anAfterContract (817), which continues on with determining cost basis decreases.
8. It sends (807) to (819), which sends (808) to itself and (809) to (820).
9. Returning back to object (817), the cost basis computation now removes all dividends associated with this event. It does this by sending "dividendsPaidThisEvent" (810) to itself. This in turn sends "dividendsPaidToDate" (811) to itself and compares this to dividendsPaidToDate of its related before image (818). The latter is determined by sending message (812) to object (818).
10. Control returns to object (816) which adjusts the contract's cost basis based on the information it received (not shown), and then control is returned to object (815).

Figure 9:
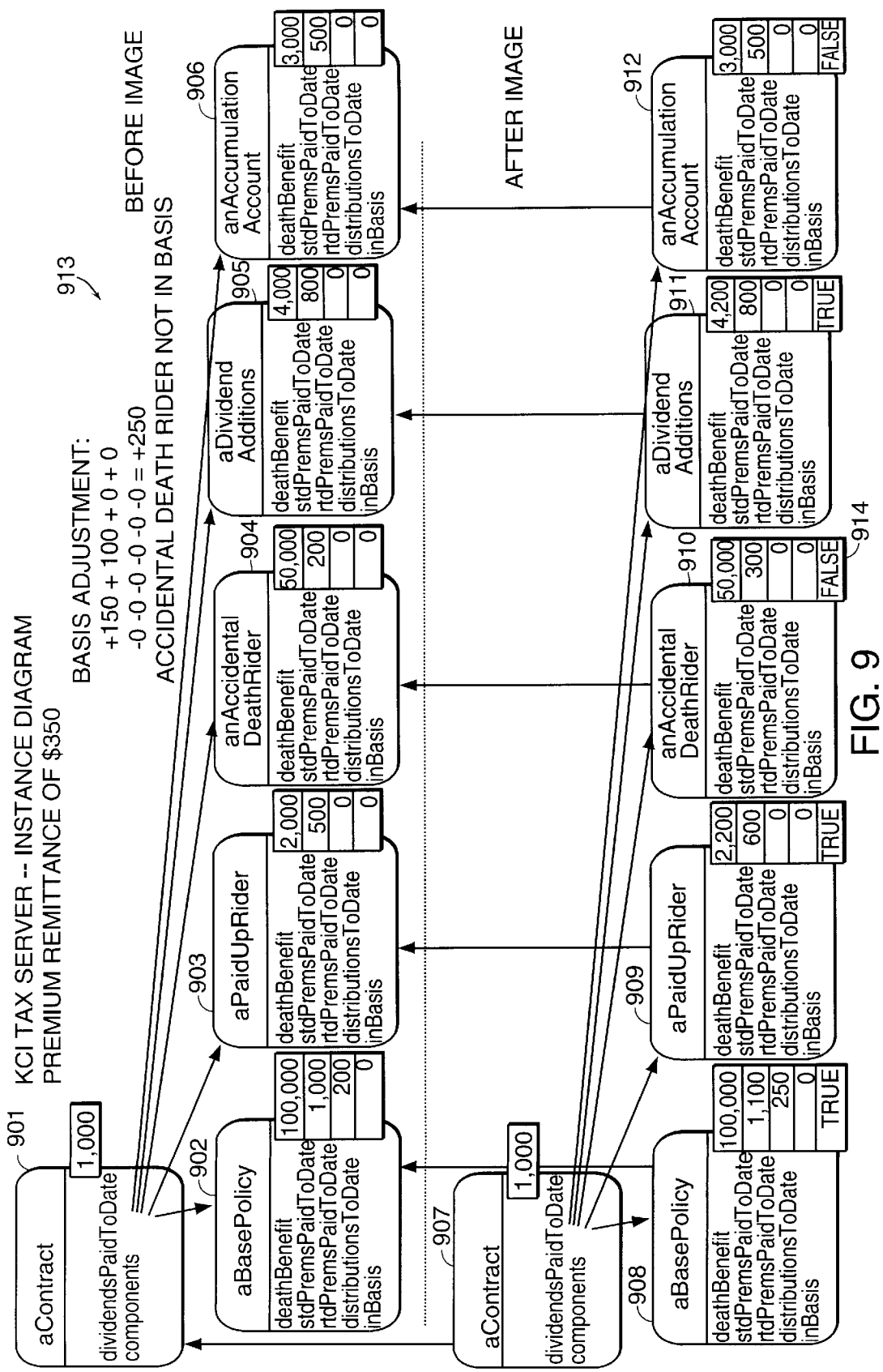
FIG. 9 is an instance diagram that provides an example of how a preferred Tax Server updates a cost basis of a contract based on a premium payment (remittance).

FIG. 9 is an instance diagram that provides an example of how a preferred Tax Server updates a cost basis of a contract based on a premium payment (remittance). This figure shows the various objects that are involved with adjusting the cost basis of a contract when a remittance, i.e. premium payment, is made. The diagram focuses on Contract (907, 901) objects and their Components (908, 909, 910, 911, 912 and 902, 903, 904, 905, and 906). Values are provided inside the objects to show some of the important data involved in the process. In this example, a premium payment of $350 was made, resulting in the Tax Server adjusting the contract's cost basis by $250.

The state change technique of comparing changes as a result of applying a particular event, shows how the money gets apportioned:

Base Policy (908) has premiums paid of $1,350 (1,100+ 250), which is up from (902)'s $1,200=+150 total change PaidUpRider (909) has premiums paid of $600, which is up from (903)'s $500=+100 total change Accidental Death Benefit Rider (910) has premiums paid of $300, which is up from 200, but this rider is not considered in cost basis (914), so the total change is 0. Knowing that an Accidental Death Benefit Rider is not included in the contract's cost basis is an example of product related tax knowledge.

Dividend Additions (911) has premiums paid of $800, which is unchanged from (905)'s 800=0 total change Accumulation Account (912) has no change=0

In performing the calculation, each Component object uses its knowledge of the tax law by knowing whether money paid for it is included in the cost basis of the contract. In this example, Components (908, 909, and 911) are included in cost basis. As such they report the increase they experienced as part of the computation. Components (910) and (912) are not included in basis, so they respond with $0.

The Contract object (907) totals up this information and then reduces the figure by the dividends received for this event, which is 0 (1,000–1,000). The overall result is +250, and indicated by calculation (913). The TaxAdvisor would instruct the Contract to increase its cost basis by $250.

Figure 10:
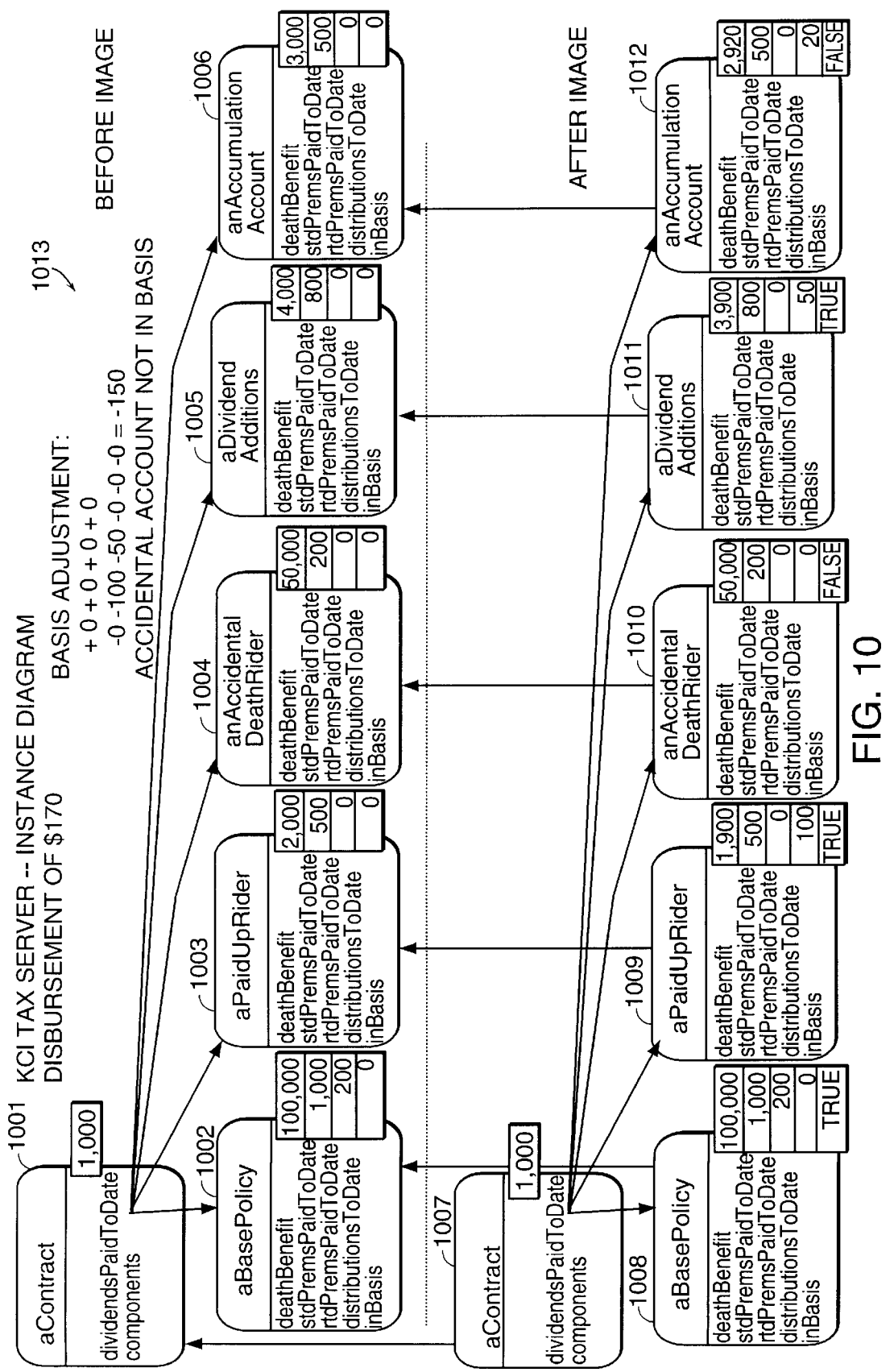
FIG. 10 is an instance diagram where the business event being processed is a disbursement (money withdrawn from the contract).

FIG. 10 is an instance diagram where the business event being processed is a disbursement (money withdrawn from the contract). This figure is similar to FIG. 9, only the business event being processed was a disbursement (or withdrawal)—meaning money was taken out of the contract, rather than paid into it. In this example, $170 was removed from the contract. The money was pulled out of three Components (1009, 1011, and 1012).

Again the state change approach enables the calculation, where objects will assist by knowing how they respond in light of the tax interpretation.

The state change technique shows how the money gets removed:

BasePolicy (1008) has no change

PaidUpRider (1009) has distributions of $100, which is up from (1003)'s 0=100 total change AccidentalDeathBenefitRider (1010) has no change DividendAdditions (1011) has distributions of $50, which is up from $0=50 total change AccumulationAccount (1012) has distributions of $20, which is up from $0=20 total change In performing the calculation, each Component object provides its knowledge of the tax law by knowing whether money paid for it is included in the cost basis of the contract. In this example, Components (1008, 1009, and 1011) are included in cost basis. As such, they report the increase they experienced as part of the computation. Components (1010) and (1012) are not included in basis, so they respond with $0.

The Contract object (1007) totals up this information and then reduces the figure by the dividends received for this event, which is 0 (1,000–1,000). The overall result is −150, and indicated by calculation (1013).

Figure 11:
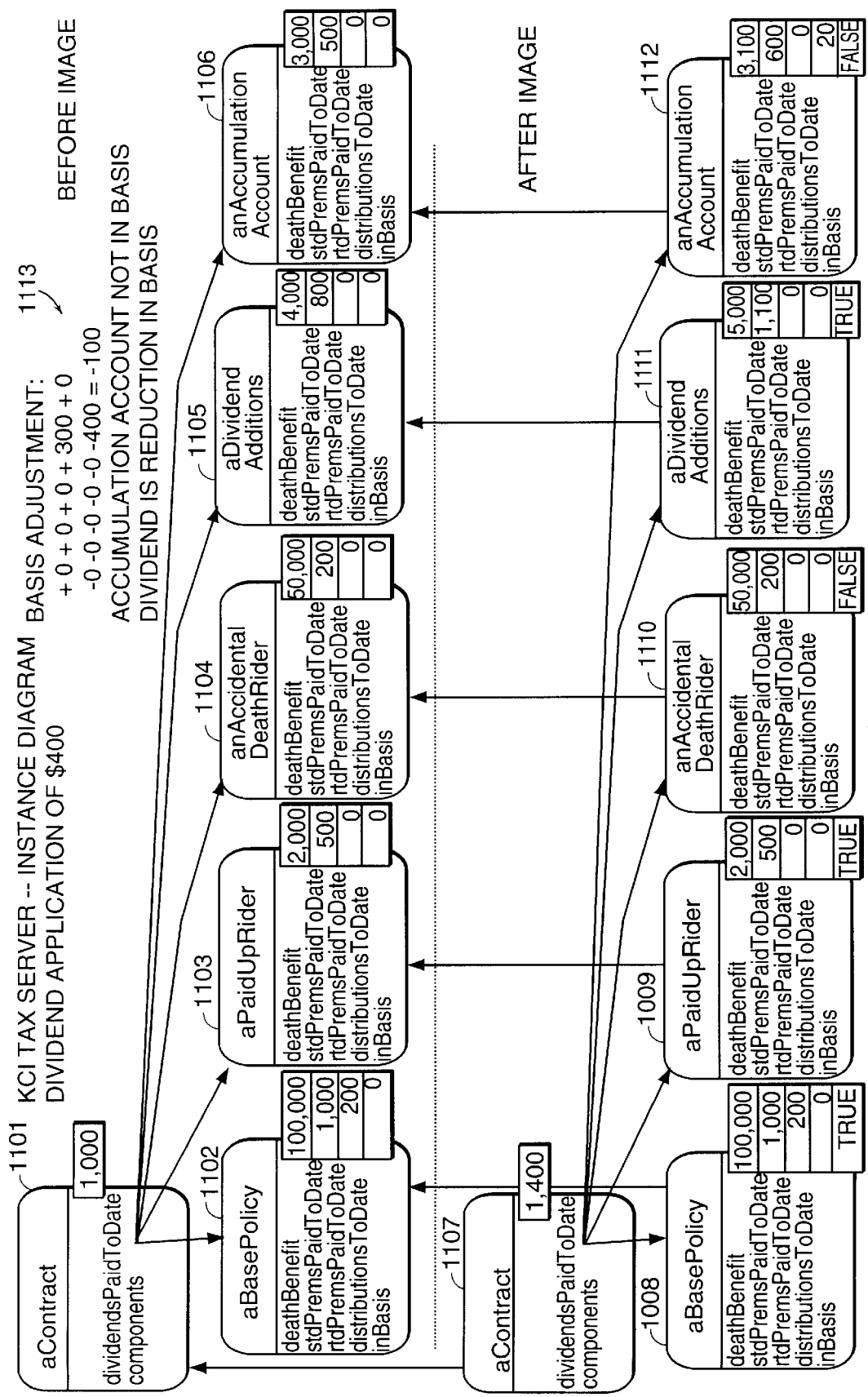
FIG. 11 is an instance diagram whereas the business event being processed is the application of a dividend.

FIG. 11 is an instance diagram where the business event being processed is the application of a dividend. This figure is similar to FIGS. 9 and 10, only the business event being processed was the year end application (spending) of the contract's dividend money. In this example, a dividend of $400 is paid and apportioned between two Components in the contract (1105 and 1106).

The state change approach enables the calculation, where objects will assist by knowing how they respond in light of the tax interpretation.

The state change technique shows how the money is tracked:

Base Policy (1108) has no change

PaidUpRider (1109) has no change

Accidental Death Benefit Rider (1110) has no change

Dividend Additions (1111) has an increase in premiums paid of $300

Accumulation Account (1112) has an increase in premiums paid of $100

In performing the calculation, each Component object provides its knowledge of the tax law by knowing whether money paid for it is included in the cost basis of the contract. In this example, Components (1108, 1109, and 1111) are included in cost basis. As such they report the increase they experienced as part of the computation. Components (1110 and 1112) are not included in basis, so they respond with $0.

The Contract object (1107) totals up this information and then reduces the figure by the dividends received for this event, which is $400 (1,400–1,000). The overall result is a change of −100, and indicated by calculation (1113).

FIG. 12 is a key to the Rumbaugh OMT (Object Modeling Technique) notation. This figure is a key to the modeling notation used in many of the models. It is the standard Rumbaugh OMT (Object Modeling Technique) notation. The key shows the symbols used for:

a class (1201)

an object (1202)

an association (1203) (a.k.a. a relationship)

a one to many association (1204)

aggregation (a.k.a. composition) (1205)

inheritance (1206)

associative class (1207)

These models may be produced using other object modeling methods, like:

the Booch method the Unified Modeling Language

Composition or aggregation is the property of object technology whereby one object can be contained inside another. Inheritance shows the relationships between super-classes and their sub-classes.

FIGS. 13A–13B are examples of a Tax Server Message Layout. These figures are representative of the data that is sent to the Tax Server with the request to perform tax evaluation. It depicts the type of information that is included in the generic messsage that is sent to the Tax Server. Here, the message layout shows some of the fields required for a traditional life contract. Fields prefixed with BEF- are before image values while fields prefixed with AFT- are after image values. Some fields are not related to the diffentent versions of the contract and appear only once, for example EVENT-EFFECTIVE-DATE.

All of this information is basic, generic insurance information, and is not dependent on any particular Application system's implementation. Insulating the Tax Server with a generic message allows it to be used by many other systems, since it is not specific to any one Application.

FIGS. 14A–14F are test cases used to demonstrate the functionality of a preferred Tax Server. FIG. 14A shows the data and expected results for test case 1. Before image data and after image data are represented in different columns, a before-image data (1401) and afterimage data (1402). A changed-data column (1403) shows the data that changed as a result of processing the event. An expected-results column (1404) indicates the expected results from processing the test case by the Tax Server.

FIG. 14B shows the data and expected results for test case 2.

FIG. 14C shows the data and expected results for test case 3.

FIG. 14D shows the data and expected results for test case 4.

FIG. 14E shows the data and expected results for test case 5.

FIG. 14F shows the data and expected results for test case 6.

FIGS. 15A–15C.are representative Tax Server output from processing one of the test cases. These figures show the Tax Server trace output for test case 3. Display messages are printed at various points during the Tax Server execution. Each display message includes some text and then the object identifies itself by printing its name in parentheses. For example (1503) shows the KciTAMRALegislation object printing the message "testing contract."

Each object that gets created from the information contained in the message is shown as(1501).

How the tax interpretation is distributed to the insurance products is shown as (1504) and (1505), (1506), (1507), and (1508). Each product adjusts based on its state change and its internal tax interpretation rules.

Reference numbers (1509), (1510), (1511), (1512), (1513), and (1514) show various test objects performing their rules.

Reference numbers (1515) shows that a taxable amount of $1,000 has resulted from processing the transaction.

Reference numbers (1516) shows the data that is sent back in the reply message to the application that originated the request.

Equivalents

While the invention has been particularly shown and described with reference to preferred embodiments thereof, it will be understood to those skilled in the art that various changes in form and detail can be made without departing from the spirit and scope of the invention as defined by the appended claims. For example, although the invention has been described with reference to particular hardware and software embodiments, it will be understood that various aspects of the invention can be embodied in either hardware, software or firmware.

These and all other equivalents are intended to be encompassed by the following claims.

What is claimed is:

1. A computer system for analyzing taxable aspects of a financial contract, comprising:
   a tax server having tax processing logic to provide generic tax computations;
   a converter to convert and uniformly present tax related financial contract data;
   a database to store tax related financial contract data managed by the converter;
   a pre-defined message, which transmits the tax related financial contract data from the converter to the tax server; and
   a client application to uniformly invoke tax processing logic on the tax server.

2. The computer of claim 1 wherein the tax related financial contract data is independent of a source of tax calculations.

3. The computer of claim 1 wherein the tax server applies the tax processing logic based on a comparison of before and after states of the financial contract.

4. The computer of claim 3 wherein the contract states are modeled by state objects representing the financial contract and an associated component, and wherein each after image state object is related to a corresponding before image state object.

5. A system for applying tax legislation to financial contracts, comprising:
   a financial subsystem having stored therein financial data including tax related financial contract data for a plurality of financial contracts of a financial contract type, the financial subsystem having a protocol for communicating the stored financial contract data external to the financial subsystem;
   a converter coupled to the financial subsystem for converting the protocol of the financial subsystem into a common request message structure; and
   a tax engine coupled to the converter and having stored therein tax processing logic for analyzing tax related financial contract data for a plurality of financial contract types, the tax engine invoking the tax processing logic in response to the financial contract data in the common request message structure.

6. The system of claim 5 wherein the tax engine is separate from the financial subsystem.

7. The system of claim 5 wherein the financial contract type is an insurance contract.

8. The system of claim 5 wherein the financial contract type is an annuity contract.

9. The system of claim 5 wherein the tax engine includes a message-based architecture.

10. The system of claim 5 wherein the tax engine transforms flat, specific information to generic information inside objects.

11. The system of claim 5 wherein the tax engine includes a plurality of sub-components, wherein a first sub-component models rules associated with generic tax legislation and a second sub-component provides a product-related tax interpretation.

12. The system of claim 5 wherein the tax engine applies the tax processing logic without instructions from the financial subsystem.

13. The system of claim 5 wherein tax legislation is embodied in objects, which include a plurality of separate test objects to model a plurality of regulatory tax sections, and whereby the test objects remain resident during processing and retain applicable results for further use during a transaction.

14. The system of claim 5 wherein the tax engine analyzes tax related financial contract data on a per transaction basis.

15. The system of claim 5 wherein the converter includes a plurality of converter modules, each converter module converting the protocol of a respective financial contract type into the common message structure.

16. The system of claim 5 further comprising:
   a database having tax related financial contract data stored therein the tax related financial contract data being managed by the converter; and
   a client application to invoke generic tax computations from tax processing logic in the tax engine.

17. The system of claim 16 wherein the tax related financial contract data is independent of a source of the tax computations.

18. The system of claim 5 wherein the tax engine applies tax processing logic based on a comparison of before and after states of the financial contract.

19. The system of claim 18 wherein the contract states are modeled by objects representing the financial contract and an associated component, and wherein each after image state object is related to a corresponding before image state object.

20. The system of claim 18 wherein the tax engine analyzes changes to tax-related insurance parameters.

21. The system of claim 18 wherein the financial subsystem is an accounting system.

22. The system of claim 18 wherein the tax engine analyzes tax compliance for financial applications.

23. The system of claim 22 wherein the financial subsystem includes a financial services commission module.

24. A computer-implemented method for applying tax legislation to financial contracts, the method comprising:

storing financial data including tax related financial contract data for a plurality of financial contracts of a financial contract type in a financial subsystem;

communicating the stored financial contract data external to the financial subsystem in a protocol;

in a converter coupled to the financial subsystem, converting the protocol of the financial subsystem into a common request message structure;

in a tax engine:

storing tax processing logic for analyzing tax related financial contract data for a plurality of financial contract types;

receiving the financial contract data in the common request message structure from the converter; and applying the tax processing logic to the tax related financial contract data in response to the financial contract data.

25. The method of claim 24 wherein the tax engine is separate from the financial subsystem.

26. The method of claim 24 wherein the financial contract type is an insurance contract.

27. The method of claim 24 wherein the financial contract type is an annuity contract.

28. The method of claim 24 wherein the tax engine includes a message-based architecture.

29. The method of claim 24 further comprising, in the tax engine, transforming flat, specific information to generic information inside objects.

30. The method of claim 24 wherein the tax engine includes a plurality of sub-components, wherein a first sub-component models rules associated with generic tax legislation and a second sub-component provides a product-related tax interpretation.

31. The method of claim 24 wherein the tax engine applies the tax processing logic without instructions from the financial subsystem.

32. The method of claim 24 wherein tax legislation is embodied in objects, which include a plurality of separate test objects to model a plurality of regulatory tax sections, and whereby the test objects remain resident during processing and retain applicable results for further use.

33. The method of claim 24 wherein the tax engine analyzes the tax related financial contract data on a per transaction basis.

34. The method of claim 24 further comprising:

storing tax related financial contract data in a database managed by the converter; and invoking generic tax computations from the tax processing logic in the tax engine in response to a client application.

35. The method of claim 34 wherein the tax related financial contract data is independent of a source of the tax computations.

36. The method of claim 24 further comprising, in the tax engine, applying tax processing logic based on a comparison of before and after states of the financial contract.

37. The method of claim 36 further comprising, in the tax engine, analyzing changes to tax-related insurance parameters.

38. The method of claim 36 wherein the financial subsystem is an accounting system.

39. The method of claim 36 wherein the contract states are modeled by objects representing the financial contract and an associated component, and wherein each after image state object is related to a corresponding before image state object.

40. The method of claim 39 wherein the comparison is performed by:

sending a message to the after image state objects; and in the after image state objects, interrogating respective related before image state objects.

41. The method of claim 36 wherein the tax engine analyzes tax compliance for financial applications.

42. The method of claim 41 wherein the financial subsystem includes a financial services commission module.

* * * * *